US012732902B2

(12) United States Patent
Kiss et al.

(10) Patent No.: US 12,732,902 B2
(45) Date of Patent: Sep. 8, 2026

(54) MANAGING MOBILITY REGISTRATION ACCESS WITH RESPECT TO NETWORK SLICES

(71) Applicant: Apple Inc., Cupertino, CA (US)

(72) Inventors: Krisztian Kiss, Rancho Santa Fe, CA (US); Alosious Pradeep Prabhakar, Singapore (SG); Rohit R. Matolia, Bengaluru (IN); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 500 days.

(21) Appl. No.: 18/120,940

(22) Filed: Mar. 13, 2023

(65) Prior Publication Data

US 2023/0319699 A1 Oct. 5, 2023

(30) Foreign Application Priority Data

Mar. 29, 2022 (IN) ............................ 202241018460

(51) Int. Cl.

| | |
|---|---|
| ***H04W 4/00*** | (2018.01) |
| ***H04W 48/18*** | (2009.01) |
| ***H04W 60/04*** | (2009.01) |
| *H04W 84/04* | (2009.01) |

(52) U.S. Cl.
CPC .......... *H04W 48/18* (2013.01); *H04W 60/04* (2013.01); *H04W 84/042* (2013.01)

(58) Field of Classification Search
CPC .... H04W 48/18; H04W 60/04; H04W 84/042
See application file for complete search history.

(56) References Cited

U.S. PATENT DOCUMENTS

| | | | | |
|---|---|---|---|---|
| 12,010,611 | B2 * | 6/2024 | Prakasam | H04W 8/205 |
| 12,395,830 | B2 * | 8/2025 | Gupta | H04W 8/08 |
| 2019/0029065 | A1 * | 1/2019 | Park | H04W 60/00 |
| 2019/0053148 | A1 * | 2/2019 | Lee | H04W 48/18 |
| 2019/0268752 | A1 * | 8/2019 | Buckley | H04W 8/06 |
| 2019/0313236 | A1 | 10/2019 | Lee et al. | |
| 2019/0342761 | A1 * | 11/2019 | Yu | H04W 60/00 |
| 2020/0221281 | A1 * | 7/2020 | Rajadurai | H04W 76/30 |
| 2020/0314701 | A1 | 10/2020 | Talebi Fard et al. | |
| 2020/0359271 | A1 * | 11/2020 | Lee | H04W 36/1443 |
| 2020/0413244 | A1 | 12/2020 | Park et al. | |
| 2021/0051466 | A1 * | 2/2021 | Kumar | H04W 8/06 |
| 2021/0282084 | A1 * | 9/2021 | Catovic | H04W 8/26 |
| 2021/0297859 | A1 | 9/2021 | Faccin et al. | |
| 2022/0117010 | A1 * | 4/2022 | Lee | H04W 76/36 |

(Continued)

FOREIGN PATENT DOCUMENTS

| | | |
|---|---|---|
| IN | 202041006520 A | 8/2021 |

OTHER PUBLICATIONS

3rd Generation Partnership Project; Technical Specification Group RAN; NR; Study on enhancement of Radio Access Network (RAN) slicing (Release 17), 3GPP TR 38.832 V17.0.0, Jun. 2021, 31 pages.

(Continued)

*Primary Examiner* — Abdelnabi O Musa
(74) *Attorney, Agent, or Firm* — Kilpatrick Townsend & Stockton LLP

(57) ABSTRACT

The present application relates to devices and components including apparatuses, systems, and methods for technologies for improving network slicing in wireless networks.

8 Claims, 17 Drawing Sheets

(56) References Cited

U.S. PATENT DOCUMENTS

2022/0272621 A1* 8/2022 Takakura ................ H04W 8/22
2022/0377659 A1 11/2022 Venkataraman et al.
2022/0394456 A1* 12/2022 Liu ......................... H04W 8/06
2023/0048803 A1 2/2023 Godin et al.
2023/0052699 A1 2/2023 Ninglekhu et al.
2023/0107525 A1* 4/2023 Gupta ................... H04W 60/00 455/435.2
2023/0115813 A1 4/2023 Sugawara et al.
2023/0132096 A1 4/2023 Shekhar et al.
2023/0138108 A1 5/2023 Mysore Viswanath et al.
2023/0156583 A1 5/2023 Murray et al.
2023/0254679 A1* 8/2023 Suh ......................... H04W 8/06 455/435.1
2023/0308852 A1* 9/2023 Srivastava ............. H04W 8/12
2023/0319687 A1 10/2023 Kim et al.
2023/0379810 A1 11/2023 Tamura et al.
2023/0388908 A1 11/2023 Wang et al.
2024/0031925 A1 1/2024 Tiwari et al.
2024/0073848 A1 2/2024 Ryu et al.
2024/0284320 A1* 8/2024 Foti ....................... H04W 48/04
2024/0389011 A1 11/2024 Ishii
2025/0063482 A1 2/2025 Sugawara
2025/0071670 A1* 2/2025 Velev .................... H04W 48/18
2025/0113291 A1* 4/2025 Olvera-Hernandez ...................... H04W 8/12

OTHER PUBLICATIONS

3rd Generation Partnership Project; Technical Specification Group Services and System Aspects; Procedures for the 5G System (5GS); Stage 2 (Release 17), 3GPP TS 23.502 V17.4.0, Mar. 2022, 738 pages.

3rd Generation Partnership Project; Technical Specification Group Services and System Aspects; Study on enhancement of network slicing; Phase 3 (Release 18), 3GPP TR 23.700-41 V0.1.0, Feb. 2022, 11 pages.

India Patent Application No. 202241018460, First Examination Report, Apr. 4, 2024, 6 pages.

India Patent Application No. 202241018461, First Examination Report, Mar. 12, 2024, 6 pages.

U.S. Appl. No. 18/120,939, Non-Final Office Action, May 21, 2025, 22 pages.

* cited by examiner

1300

| 8 | 7 | 6 | 5 | 4 | 3 | 2 | 1 | |
|---|---|---|---|---|---|---|---|---|
| Network slicing indication IEI | | | | 0 Spare | NSSoR | DCNI | NSSCI | Octet 1 |

MANAGING MOBILITY REGISTRATION ACCESS WITH RESPECT TO NETWORK SLICES

CROSS-REFERENCE TO RELATED APPLICATION

This application claims the benefit of India Patent Application No. 202241018460, filed on Mar. 29, 2022, which is herein incorporated by reference in its entirety for all purposes.

BACKGROUND

Third Generation Partnership Project (3GPP) Technical Specifications (TSs) define standards for wireless networks. One area of study for developing these TSs is for managing registration and mobility aspects with respect to network slices.

BRIEF DESCRIPTION OF THE DRAWINGS

FIG. 13 illustrates an information element in accordance with some embodiments.

FIG. 15 illustrates another operational flow/algorithmic structure in accordance with some embodiments.

DETAILED DESCRIPTION

Figure 1:
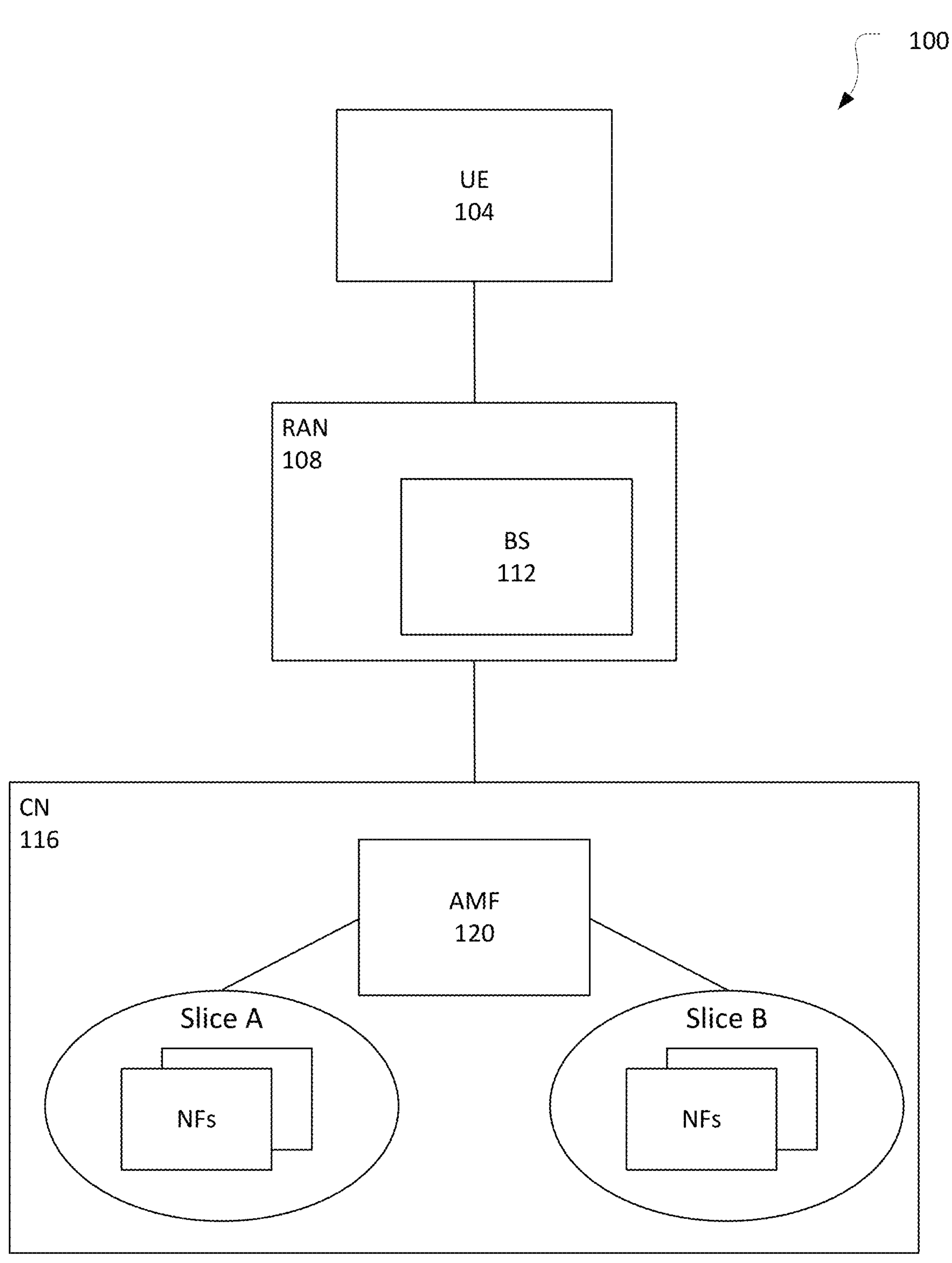
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, or network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

Various embodiments of the disclosure are related to network slicing improvements. Some embodiments improve support of registration areas (RAs) that include tracking areas (TAs) that support rejected single-network slice selection assistance information (S-NSSAI). Other embodiments improve provision of visiting public land mobile network (VPLMN) network slice information to a roaming user equipment (UE).

FIG. 1 illustrates a network environment 100 in accordance with some embodiments. The network environment 100 may include a UE 104 couple with a radio access network (RAN) 108 that includes a base station (BS) 112. The UE 104 and the BS 112 may communicate over air interfaces compatible with 3GPP TSs such as those that define Fifth Generation System (5GS) (or later) standards. The BS 112 may be a next generation node B (gNB) to provide one or more New Radio (NR) cells that present NR user plane and control plane protocol terminations toward the UE 104.

The RAN 108 may be coupled with a core network (CN) 116. The CN 116 may have a variety of network functions that provide services such as storing subscription information, authenticating UEs/network components, registering and tracking UEs, managing quality of service (QoS) aspects, controlling data sessions, and forwarding uplink/downlink traffic. The CN 116 may include an access and mobility management function (AMF) 120 that is responsible for registration management (e.g., for registering the UE 104), connection management, reachability management, mobility management, lawful interception of AMF-related events, and access authentication and authorization.

In order to accommodate various vertical use cases, the CN 116 may employ network slicing to support different combinations of core network functionalities and configurations within one public land mobile network (PLMN). A network slice (or simply "slice") may represent a distinct set of core network functions that are provided to one or more UEs. This may provide an operator with more control over the network functions that handle application traffic.

The UE 104 may be concurrently connected to a plurality of network slices, for example, slice A and slice B. Slices A and B may share the same RAN 108 and AMF 120. Each of the slices may include a plurality of network functions (NFs). These NFs may include: a user plane function (UPF) to handle a user plane path of protocol data unit (PDU) sessions to facilitate routing of traffic to and from a data network; a session management function (SMF) to configure traffic steering QoS control and policy-related functions at the UPF; a policy control function (PCF) to provide policy and charging control; and a unified data manager (UDM) to store and manage subscriber data. Some of these functions, for example, the UDM, may be shared among more than one slice.

Within a PLMN or a stand-alone non-public network (SNPN), a network slice is identified by a S-NSSAI. An S-NSSAI may include a slice/service type (SST) and, optionally, a slice differentiator (SD). A set of one or more S-NSSAIs may be referred to as an NSSAI.

The UE 104 may send a requested NSSAI to inform the AMF 120 of the slices to which the UE intends to register. The requested NSSAI may include one or more S-NSSAIs that respectively correspond to the one or more slices. The AMF 120 may respond with an Allowed NSSAI or a Rejected NSSAI as appropriate.

It may be desirable to determine whether and how to initiate a registration for a rejected S-NSSAI that was rejected in a first TA of an RA but may be available in other TAs of the RA. Previously, when an AMF creates an RA with one or more TAs, all the S-NSSAIs of an Allowed NSSAI need to be available in all the TAs of the RA. If a requested NSSAI contains an S-NSSAI that is available only in some specific TAs of the RA, an AMF may attempt to create an RA that only includes the specific TAs. However, it may be challenging to create such an RA while providing a desired trade-off between the paging load versus a load generated due to mobility registration update (MRU) requests.

Embodiments describe enhancements to the system that allow the AMF 120 to configure an RA to include TAs that support S-NSSAI(s) that are not supported by other TAs of the RA. This may allow the AMF 120 to add a TA to an RA for mobility or MRU signaling reasons, even if a slice, available in other TAs of the RA, is not available in the added TA.

Figure 2:
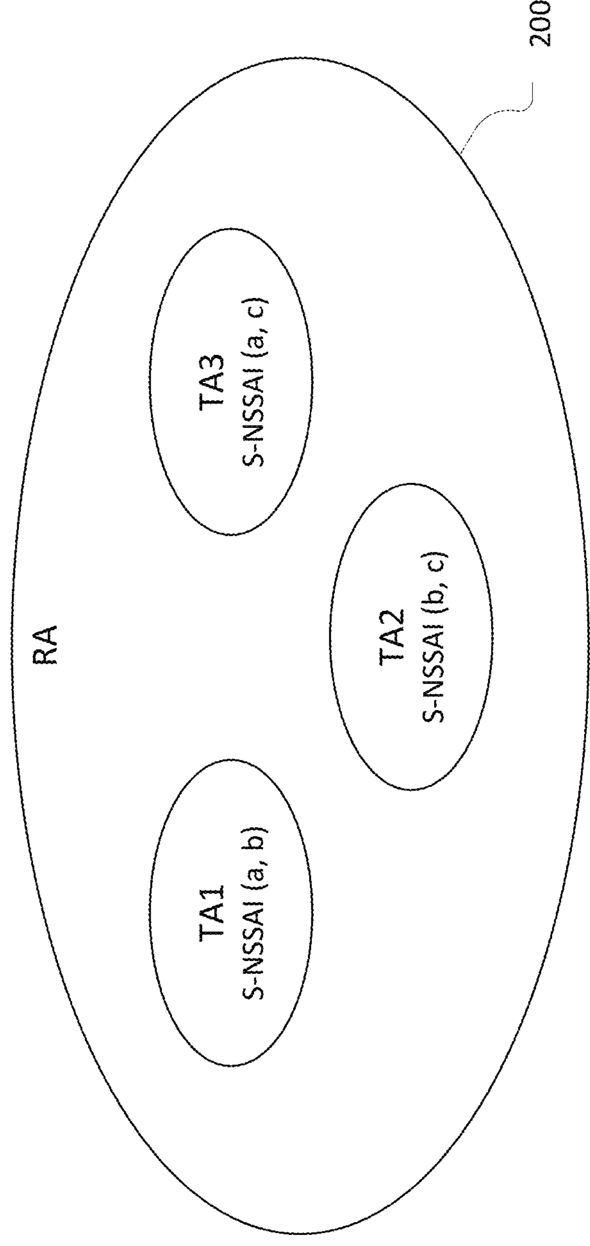
FIG. 2 illustrates a registration area in accordance with some embodiments.

FIG. 2 illustrates an RA 200 in accordance with some embodiments. The RA 200 may include a first TA (TA1) in which S-NSSAIs a and b are available; a second TA (TA2) in which S-NSSAIs b and c are available; and a third TA (TA3) in which S-NSSAIs a and c are available.

Figure 3:
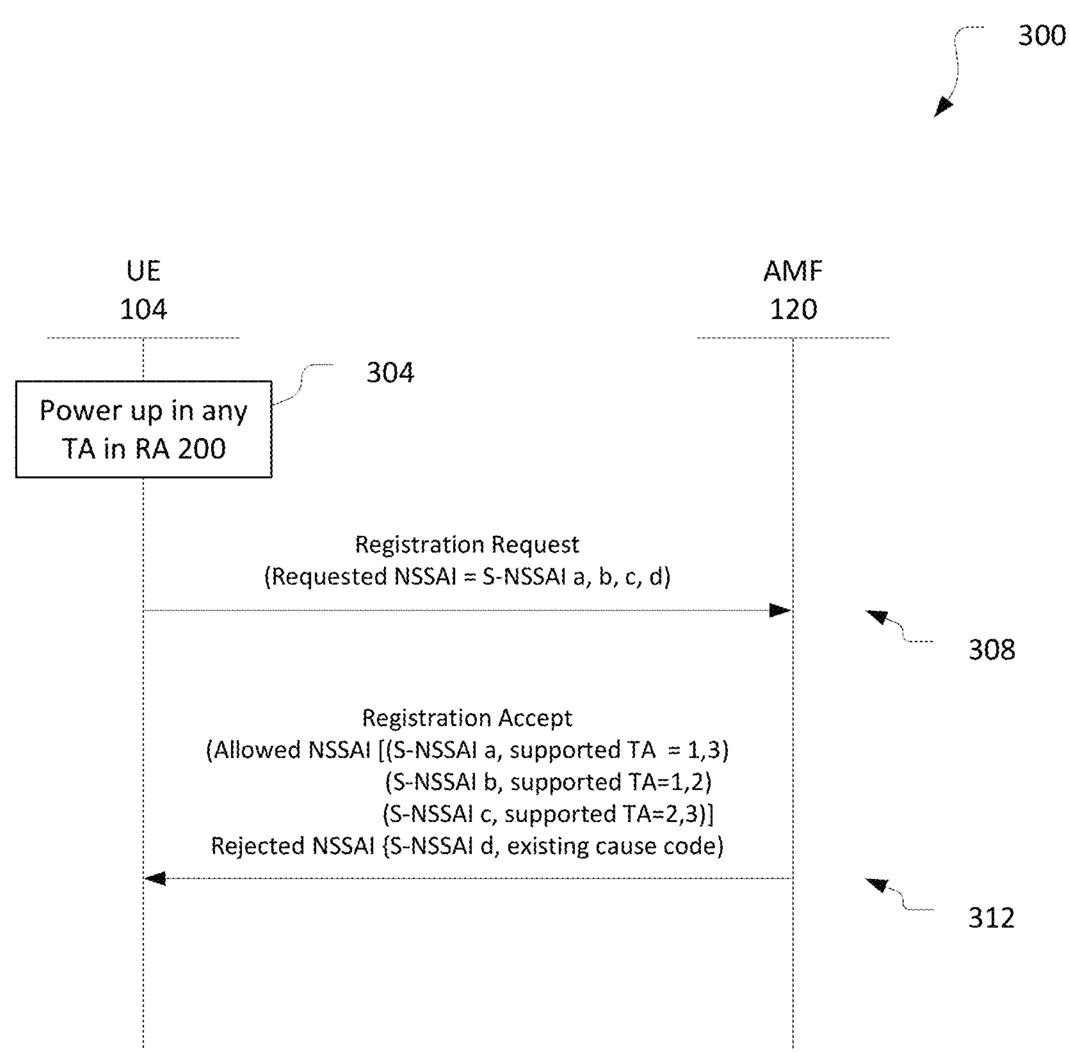
FIG. 3 illustrates a registration procedure in accordance with some embodiments.

FIG. 3 illustrates a registration procedure 300 with respect to the RA 200 in accordance with some embodiments. The registration procedure 300 may occur when the UE 104 performs an initial registration.

The registration procedure 300 may include, at 304, the UE 104 powering up in any TA of the RA 200.

The registration procedure 300 may further include, at 308, the UE 104 transmitting a registration request message to the AMF 120. The registration request message may include a requested NSSAI that indicates network slices with which the UE 104 intends to register. In particular, the requested NSSAI may include S-NSSAI a, b, c, and d.

The registration procedure 300 may further include, at 312, the AMF 120 transmitting a registration accept message to the UE 104. The registration accept message may include an Allowed NSSAI with a list of S-NSSAIs supported in at least one TA of the RA 200. The Allowed NSSAI may further provide an indication of which TAs are supported for a particular network slice. As shown, the Allowed NSSAI may indicate that S-NSSAI a is supported in TAs 1 and 3, S-NSSAI b is supported in TAs 1 and 2, and S-NSSAI c is supported in TAs 2 and 3.

The UE 104 may determine, based on the Allowed NSSAI received in the registration accept message, that some slices are allowed in all TAs within one RA or that some slices are restrictively allowed only in certain TAs within the one RA.

The registration accept message may also include a Rejected NSSAI that includes any S-NSSAIs that are not supported in any TA of the RA 200. As shown, the Rejected NSSAI may indicate that S-NSSAI d is not supported in any TA of the RA 200. This indication may be provided by an existing cause code such as "S-NSSAI not available in the current registration area."

The UE 104 may determine, based on the Rejected NSSAI received in the registration accept message (or a registration reject message), that some slices are not allowed in any TA within the same RA.

Figure 4:
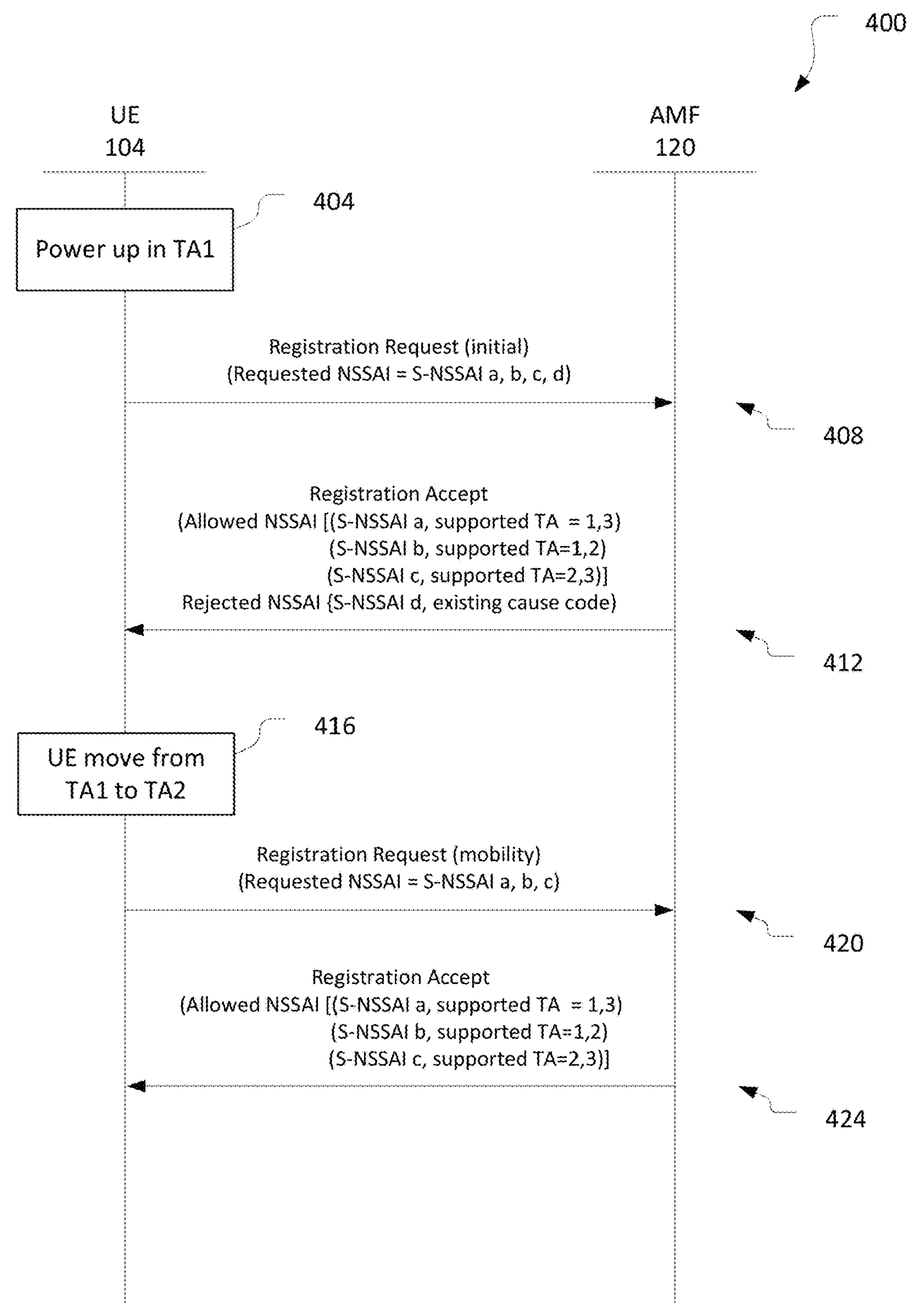
FIG. 4 illustrates another registration procedure in accordance with some embodiments.

FIG. 4 illustrates a registration procedure 400 with respect to the RA 200 in accordance with some embodiments. The registration procedure 400 may include an initial registration and a mobility registration.

The registration/mobility procedure 400 may include the UE 104 powering up in TA1 at 404.

At 408, the UE 104 may send an initial registration request to the AMF 120. The registration request message may include a requested NSSAI that indicates network slices with which the UE 104 intends to register. In particular, the requested NSSAI may include S-NSSAIs a, b, c, and d.

The registration procedure 400 may further include, at 412, the AMF 120 transmitting a registration accept message to the UE 104. The registration accept message may include an Allowed NSSAI with a list of S-NSSAIs supported in at least one TA of the RA 200. The Allowed NSSAI may further provide an indication of which TAs are supported for a particular network slice. As shown, the Allowed NSSAI may indicate that S-NSSAI a is supported in TAs 1 and 3, S-NSSAI b is supported in TAs 1 and 2, and S-NSSAI c is supported in TAs 2 and 3.

The registration accept message may also include a Rejected NSSAI that includes any S-NSSAIs that are not supported in any TA of the RA 200. As shown, the Rejected NSSAI may indicate that S-NSSAI d is not supported in any TA of the RA 200. This indication may be provided by an existing cause code such as "S-NSSAI not available in the current registration area."

At 416, the UE 104 may move from TA1 to TA2. The UE 104 may have a record of network slices that are supported in particular TAs. Therefore, when the UE 104 sends the registration request for mobility purposes at 420, the UE 104 may include a requested NSSAI that includes the supported network slices, for example, S-NSSAIs a, b, and c.

The AMF 120 may then transmit the registration accept message with the Allowed NSSAI that is similar to the Allowed NSSAI of 412. However, as the S-NSSAI d was not in the requested NSSAI, the registration accept message does not include a Rejected NSSAI.

As a UE 104 moves among RAs and TAs, it may store allowed and rejected slice information in a local table such as Table 1 below.

TABLE 1

| Slice | H-PLMN (MCC-MNC) | Supported RA | Supported TA | Mapping |
|---|---|---|---|---|
| S-NSSAI a | 525-01 | X | 1, 3 | [X, 1], [X, 3], |
| | 525-01 | Y | 1, 2 | [Y, 1], [Y, 2] |
| S-NSSAI b | 525-01 | X | 1, 2 | [X, 1], [X, 2] |
| S-NSSAI c | 525-01 | X | 2, 3 | [X, 2], [X, 3] |

The HPLMN is listed by mobile country code (MCC)—mobile network code (MNC). Thereafter, the UE 104 may generate a requested NSSAI based on information from the local table.

While Table 1 is provided for a home PLMN (H-PLMN), 525-01, a similar table may be created in a V-PLMN along with an HPLMN mapping.

Figure 5:
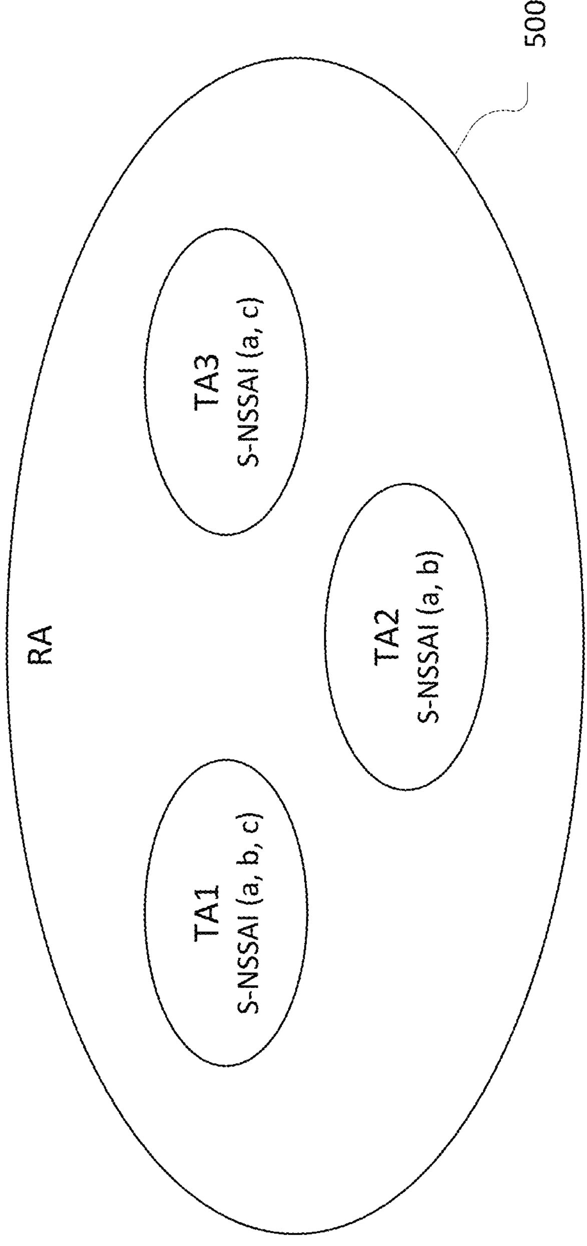
FIG. 5 illustrates another registration procedure in accordance with some embodiments.

FIG. 5 illustrates an RA 500 in accordance with some embodiments. The RA 500 may include a first TA (TA1) in which S-NSSAIs a, b, and c are available; a second TA (TA2) in which S-NSSAIs a and b are available; and a third TA (TA3) in which S-NSSAIs a and c are available.

Figure 6:
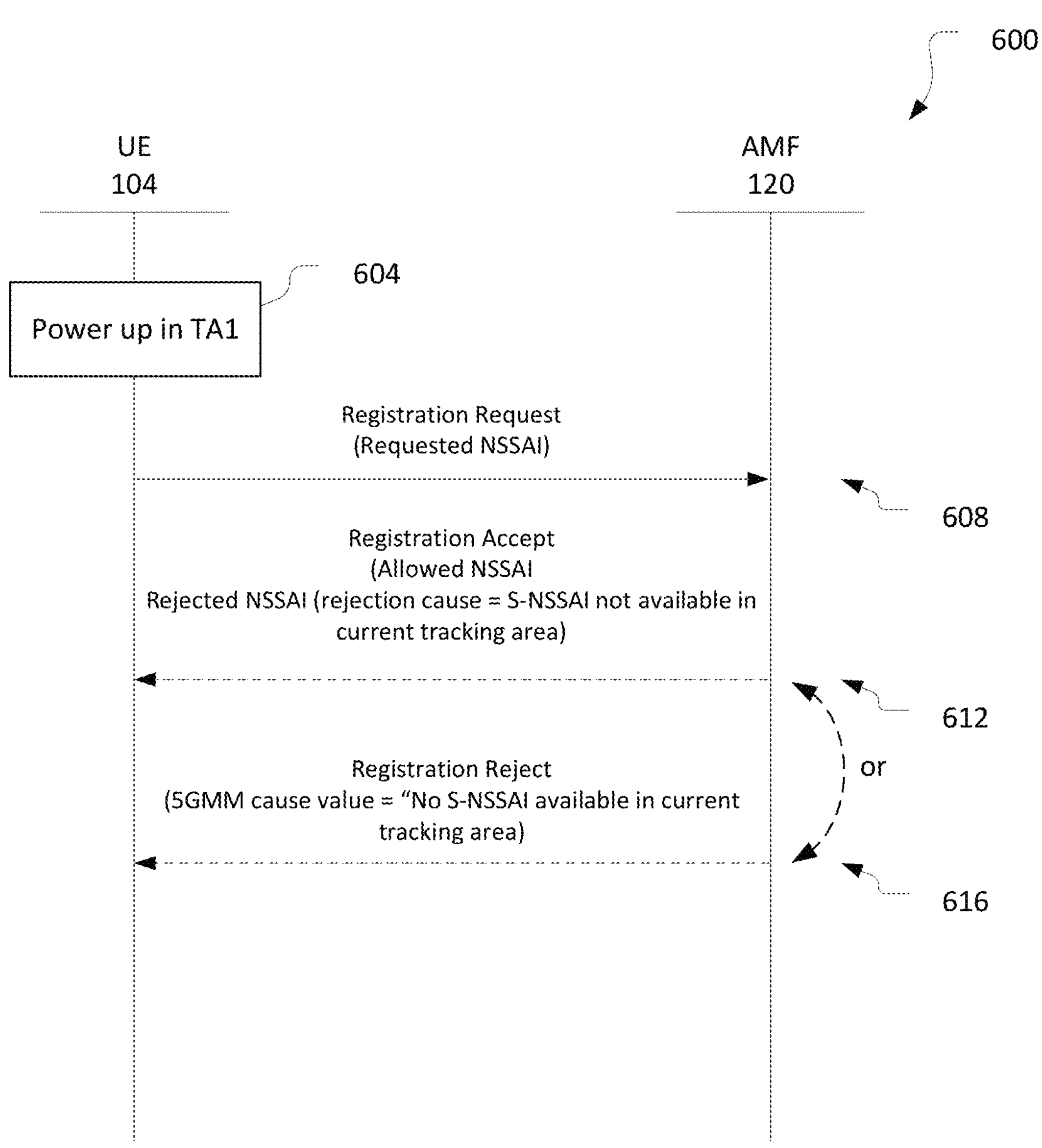
FIG. 6 illustrates another registration procedure in accordance with some embodiments.

FIG. 6 illustrates a registration procedure 600 with respect to the RA 500 in accordance with some embodiments.

At 604, the UE 104 may power up in TA1.

The registration procedure 600 may include the UE 104 sending a registration request message at 608. The registration request message may include a requested NSSAI as discussed above.

In response to the registration request message, the AMF 120 may transmit a registration response message.

In the event that at least one of the requested S-NSSAIs is available in TA1, the registration response message may be registration accept message transmitted at 612. The registration accept message may include an Allowed NSSAI that lists the slices that are available in TA1. In some embodiments, the Allowed NSSAI may simply list the slices and the UE 104 may determine that the listed slices are supported in the current TA, but may not have any additional information about other TAs in which the slices are supported. In other embodiments, the Allowed NSSAI may also include a list of supported TAs for each slice (similar to that described above with respect to FIGS. 3 and 4).

The registration accept message may further include a Rejected NSSAI that lists the slices that are not available in TA1. The AMF 120 may include a "S-NSSAI not available in the current tracking area" rejection cause for each S-NSSAI present in the Rejected NSSAI. For example, if the requested NSAAI requests S-NSSAIs a, b, c, and d, the Allowed NSSAI may include S-NSSAIs a, b, and c; while the Rejected NSSAI may include S-NSSAI d with a rejection cause "S-NSSAI not available in current tracking area."

When the UE 104 moves to a different TA within the same RA, the UE 104 may consider including S-NSSAIs from the Rejected NSSAI in the registration request based on the rejection cause. For example, if the "S-NSSAI not available in the current tracking area" rejection cause was present in the Rejected NSSAI for S-NSSAI d, the UE 104 may include S-NSSAI d as part of a requested NSSAI in the registration request used for mobility update procedure. If, instead of the "S-NSSAI not available in the current tracking area" rejection cause, the Rejected NSSAI included a different rejection cause for the S-NSSAI d (for example, an "S-NSSAI not available in registration area"), the UE 104 may not include the S-NSSAI d in the requested NSSAI while the UE 104 is in the same RA.

In some embodiments, the Rejected NSSAI may additionally include information about TAs in which a slice is supported. For example, if the UE 104 requests S-NSSAI b while in TA3, the AMF 120 may send a Rejected NSSAI to the UE 104 that indicates that NSSAI b is not supported in TA3, but is supported in TA1 and TA2.

In the event that all requested S-NSSAIs are rejected in the current TA, the registration response message may be registration reject message transmitted at 616. The registration reject message may include a cause code "No S-NSSAI available in current tracking area." This may happen if, for example, the UE 104 is in TA1 and sends a requested NSSAI with S-NSSAI d. The UE 104, upon receiving the cause code "No S-NSSAI available in current tracking area," may understand that the requested slices are rejected only in the current tracking area. Then, when the UE 104 moves to a different TA within the same RA, the UE 104 may consider including the previously rejected S-NSSAI(s) in a registration request.

As discussed above with respect to the Rejected NSSAI in the registration accept message, the Rejected NSSAI in the registration reject message may additionally include information about TAs in which each slice is supported in accordance with some embodiments.

While the embodiments of FIGS. 3 and 4 provide relatively robust and flexible solutions, the embodiments of FIG. 6 may be capable of providing backward compatibility with UEs that only support TSs from earlier releases.

Figure 7:
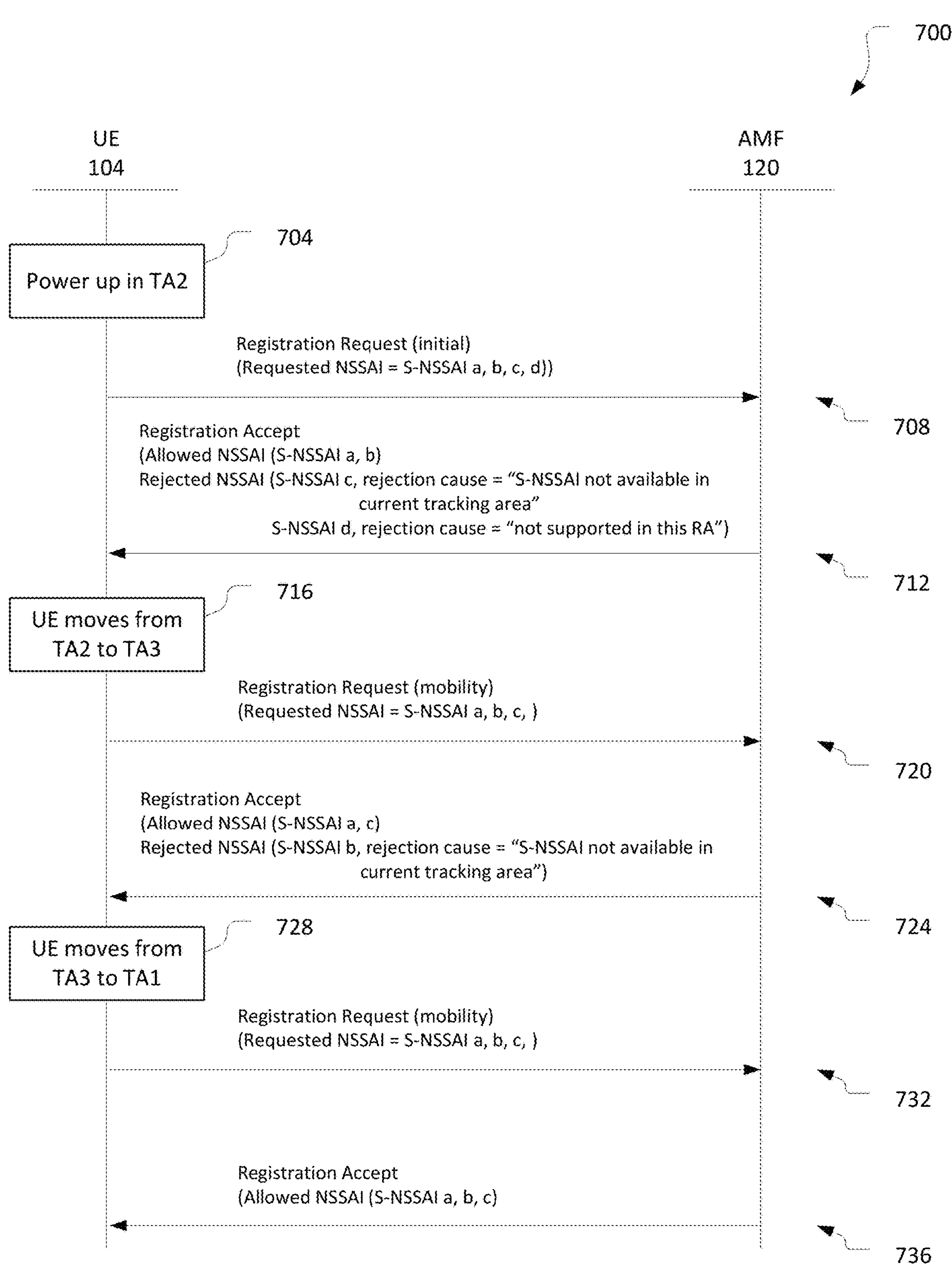
FIG. 7 illustrates another registration procedure in accordance with some embodiments.

FIG. 7 illustrates a registration procedure 700 with respect to the RA 500 in accordance with some embodiments. The registration procedure 700 may include an initial registration and mobility registrations.

At 704, the UE 104 may power up in TA2.

At 708, the UE 104 may send an initial registration request with a requested NSSAI that includes S-NSSAI a, b, c, and d.

At 712, the AMF 120 may transmit a registration accept message to the UE 104. The registration accept message may include an Allowed NSSAI that indicates S-NSSAIs a and b are allowed in TA2. The registration accept message may also include a Rejected NSSAI that indicates S-NSSAI c is not available in a current tracking area (for example, TA2) and S-NSSAI d is not supported in this RA (for example, RA 500).

At 716, the UE 104 may move from TA2 to TA3.

At 720, the UE 104 may send a registration request based on the mobility event. At this point, the UE 104 may know that S-NSSAI a and c are supported by TA3 and S-NSSAI d is not supported by TA3, and may not know whether S-NSSAI b is supported by TA3. Thus, the requested NSSAI may include S-NSSAI a, b, c.

At 724, the AMF 120 may send a registration accept message to the UE 104. The registration accept message may include an Allowed NSSAI that includes S-NSSAIs a and c; and a Rejected NSSAI that includes S-NSSAI b with a rejection cause that indicates the S-NSSAI is not available in the current tracking area.

At 728, the UE 104 may move from TA3 to TA1. At this point, the UE may know that TA1 supports S-NSSAIs a and b; TA1 does not support S-NSSAI d; and may not know whether TA1 supports S-NSSAI c (unless the UE 104 knows that the RA 500 only includes three TAs). Therefore, at 732, the UE 104 may transmit the registration request with a requested NSSAI that includes S-NSSAIs a, b, and c.

At 736, the AMF 120 may transmit a registration accept message with an Allowed NSSAI that includes S-NSSAIs a, b, and c.

As a UE 104 moves among RAs and TAs, it may store allowed and rejected slice information in a local table such as Table 2 below.

TABLE 2

| Slice | H-PLMN | Supported RA | Supported TA | Mapping |
|---|---|---|---|---|
| S-NSSAI a | 525-01 | X | 1, 2, 3 | [X, 1], [X, 2], [X, 3] |
| | 525-01 | Y | 1, 2 | [Y, 1], [Y, 2] |
| S-NSSAI b | 525-01 | X | 1, 2 | [X, 1], [X, 2] |
| S-NSSAI c | 525-01 | X | 1, 3 | [X, 1], [X, 3] |
| S-NSSAI d | 525-01 | Y | 1, 2 | [Y, 1], [Y, 2] |

The UE 104 may incrementally populate the local table with the latest information (e.g, allowed and Rejected NSSAIs in each TA/RA) as the information is received from the AMF 120. Thereafter, the UE 104 may generate a requested NSSAI based on information from the local table.

While Table 2 is provided for an H-PLMN, 525-01, a similar table may be created in a V-PLMN along with an HPLMN mapping.

Figure 8:
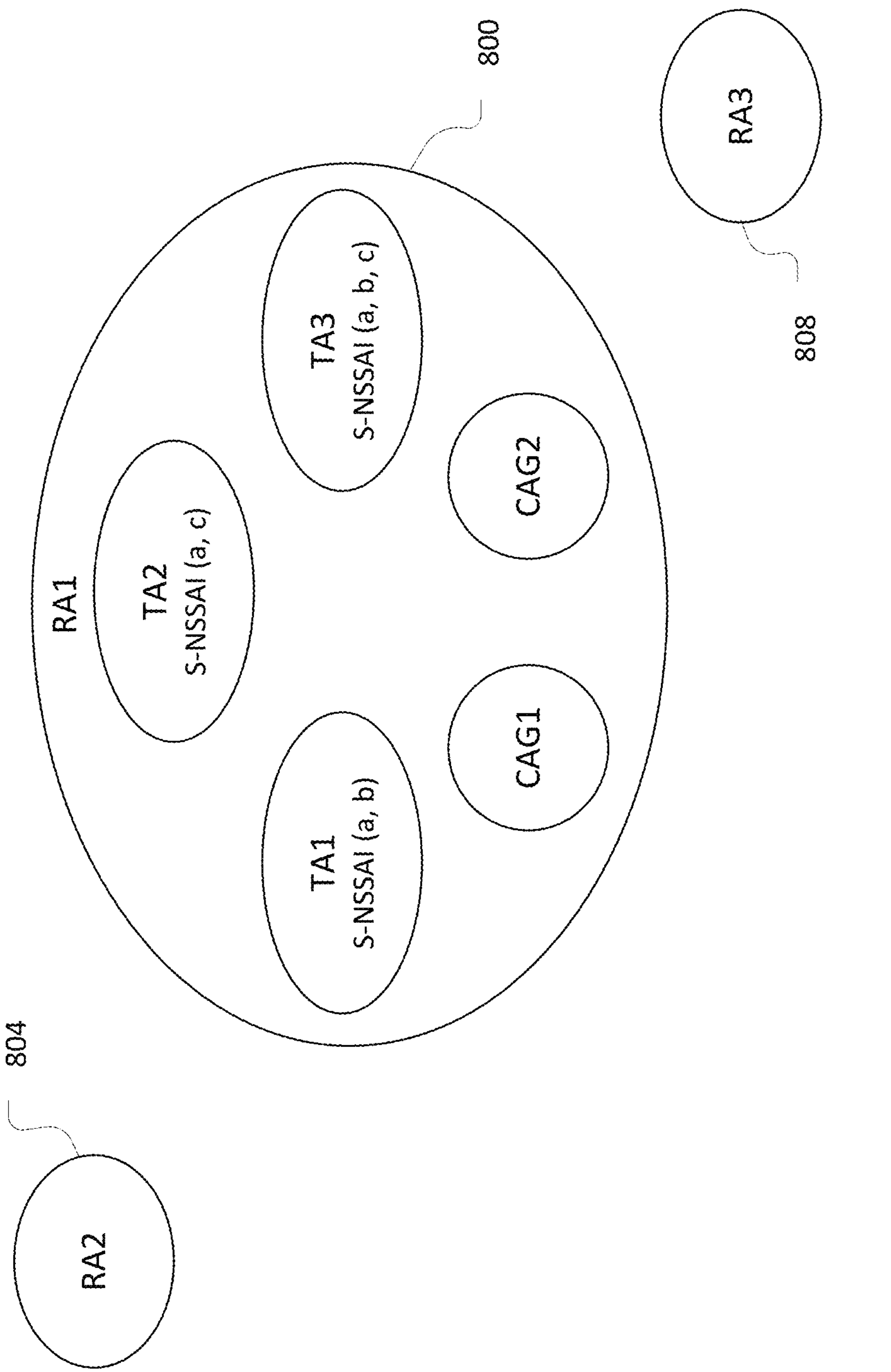
FIG. 8 illustrates a network with a plurality of registration areas in accordance with some embodiments.

FIG. 8 illustrates a network 800 having a plurality of RAs in accordance with some embodiments. In particular, the network 800, which may be a PLMN or an SNPN, may include a first registration area (RA1) 804, a second registration area (RA2) 808, and a third registration area (RA3).

RA1 804 is shown with three tracking areas. TA1 includes S-NSSAIs a and b, TA 2 includes S-NSSAIs a and c, and TA3 includes S-NSSAIs a, b, and c. RA1 804 is also shown with two closed access groups (CAGs), CAG1 and CAG2.

In current networks, a slice may be rejected at the PLMN/SNPN level or the RA level. Current networks do not allow for slice rejection and retry mechanisms on TA or CAG levels. The following embodiments describe slice registration management for a UE moving between TAs/CAGs in a network such as network 800.

If the UE 104 received an indication that a S-NSSAI is not supported in a TA/CAG, the UE 104 may later request the S-NSSAI when it may be available. In some embodiments, the UE 104 may send a subsequent request for the S-NSSAI in a mobility registration request message that is transmitted after a TA/CAG change. This may allow the UE 104 to obtain the S-NSSAI as soon the UE 104 transitions out of a current TA/CAG. However, this may also add additional load to the network when multiple registration request messages are sent in instances in which the S-NSSAI is not supported in more than one TA/CAG of an RA. Some embodiments may provide an additional information element (IE) in the Rejected NSSAI of the registration response message. The IE may provide the UE instructions to retry registration when TA/CAG is changed.

In another embodiment, the UE 104 may send a subsequent request for the S-NSSAI in a mobility registration request message only after receiving a UE configuration update. In some instances a subscription may change dynamically and the network may reconfigure S-NSSAI support in a TA/CAG. Thus, after receiving a UE configuration update, the UE may send a mobility registration request to the AMF 120 to request a previously rejected S-NSSAI. This may also add additional load to the network when multiple registration request messages are sent in instances in which a TA/CAG is not updated with the desired S-NSSAI.

Use of the additional IE and transmission of the mobility registration request after the UE configuration update may be used separately or in combination with one another.

Figure 9:
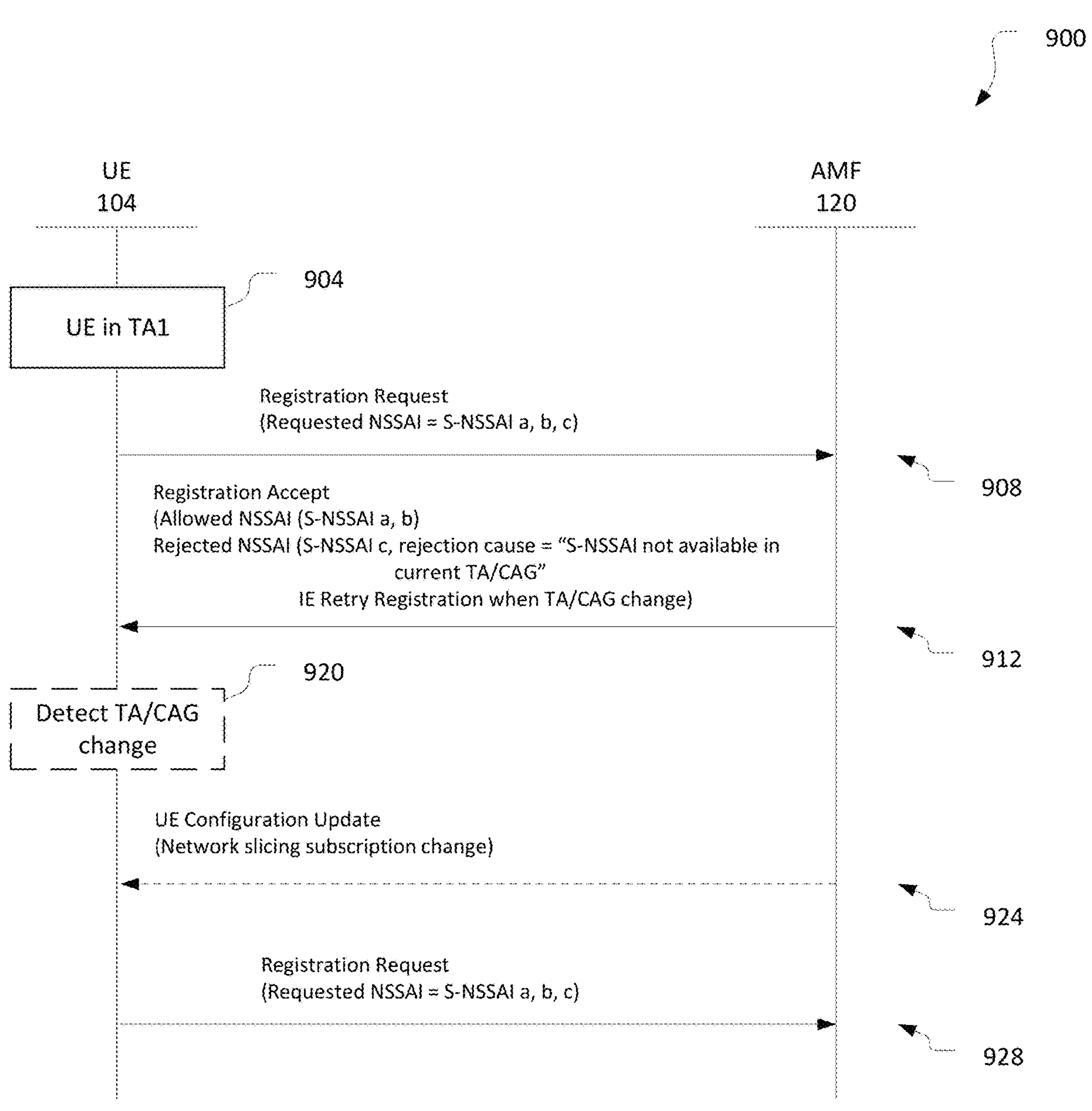
FIG. 9 illustrates another registration procedure in accordance with some embodiments.

FIG. 9 illustrates a registration procedure 900 with respect to the network 800 in accordance with some embodiments.

At 904, the UE 104 may be in TA1.

The registration procedure 900 may include, at 908, the UE 104 sending a registration request message to the AMF 120. The registration request message may include a requested NSSAI that includes S-NSSAIs a, b, and c.

The registration procedure 900 may further include, at 912, the AMF 120 sending a registration accept message to the UE 104. The registration accept message may include an Allowed NSSAI that includes S-NSSAIs a and b and may also include a Rejected NSSAI with S-NSSAI c with a rejection cause that indicates the S-NSSAI is not available in the current TA/CAG. The registration accept message may further include, in the Rejected NSSAI or elsewhere, an IE retry registration when TA/CAG change.

If the UE 920 then detects a TA/CAG change at 920, the UE 104 may send another registration request at 928 that includes a request for the S-NSSAI c (and S-NSSAIs a and b).

In the event the UE 104 is configured to send a mobility registration request only after getting a UE configuration update, receipt of a UE configuration update with network slicing subscription change at 924 may prompt the subsequent registration request transmission at 928.

Figure 10:
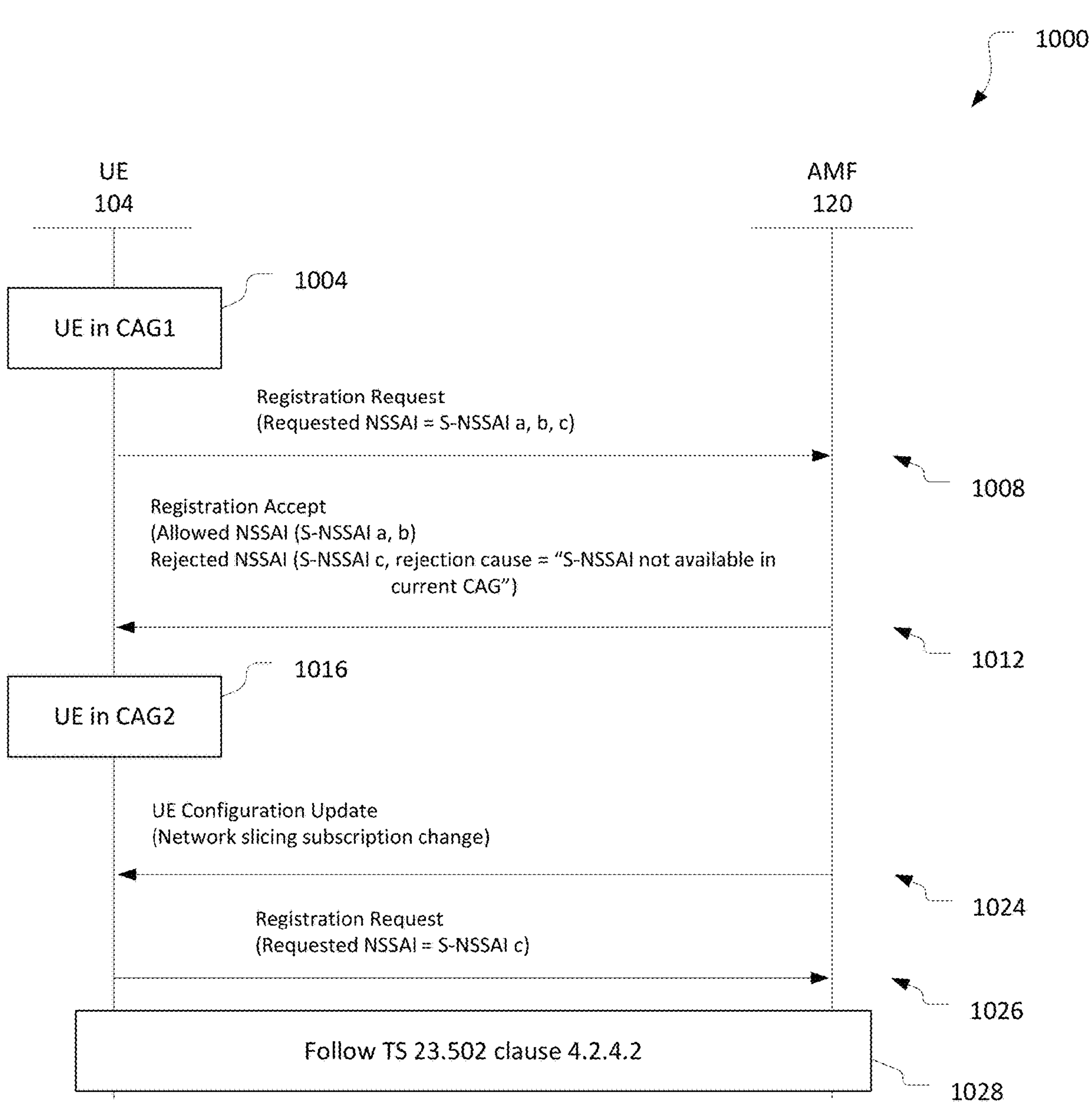
FIG. 10 illustrates another registration procedure in accordance with some embodiments.

FIG. 10 illustrates a registration procedure 1000 with respect to the network 800 in accordance with some embodiments. The registration procedure 1000 illustrates a scenario in which the UE 104 transitions from CAG1 to CAG2.

At 1004, the UE 104 may be in CAG1.

The registration procedure 1000 may include, at 1008, the UE 104 sending a registration request message to the AMF 120. The registration request message may include a requested NSSAI that includes S-NSSAIs a, b, and c.

The registration procedure 1000 may further include, at 1012, the AMF 120 sending a registration accept message to the UE 104. The registration accept message may include an Allowed NSSAI that includes S-NSSAIs a and b and may also include a Rejected NSSAI with S-NSSAI c with a rejection cause that indicates the S-NSSAI is not available in the current CAG.

Based on the cause code "S-NSSAI not available in the current CAG," the UE 104 may store the rejected S-NSSAI(s) in the Rejected NSSAI for the current CAG and may not attempt to use the S-NSSAI(s) in the current CAG until switching off the UE 104, moving out of the current CAG, a universal integrated circuit card (UICC) containing a universal subscriber identity module (USIM) is removed, the entry of the "list of subscriber data" with the SNPN identity of the current SNPN is updated, or the rejected S-NSSAI(s) are removed or deleted.

At 1016, the UE 104 may be in CAG2.

The registration procedure 1000 may further include, at 1024, the AMF 120 transmitting a UE configuration update to the UE 104. The UE configuration update may include network slicing subscription change information.

After receiving the UE configuration update at 1024, the UE may transmit and another registration request at 1026 (to request slice c) and, at 1028, follow operations similar to those described in clause 4.2.4.2 of 3GPP TS 23.502 v17.4.0 (2022-03-23).

Figure 11:
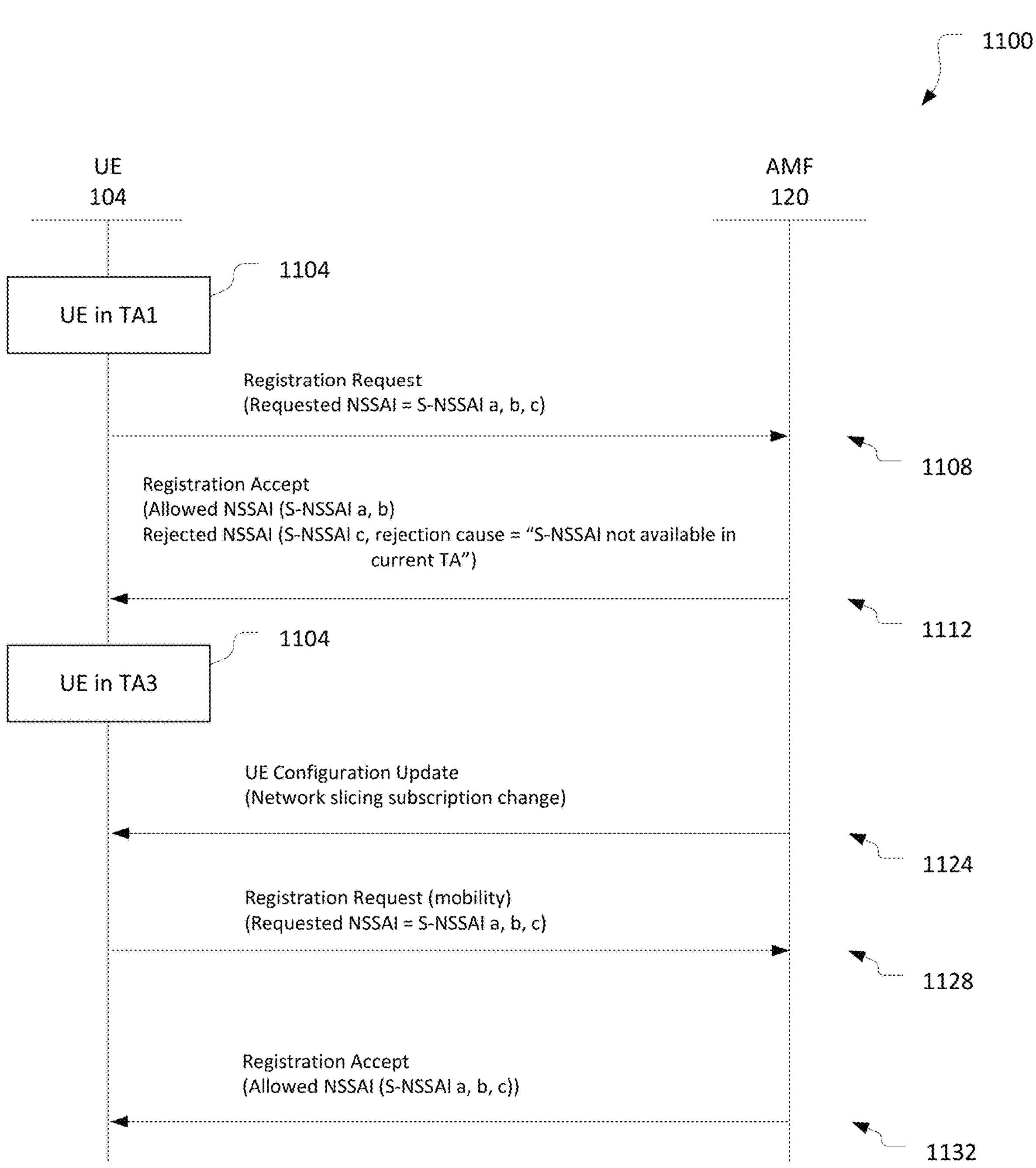
FIG. 11 illustrates another registration procedure in accordance with some embodiments.

FIG. 11 illustrates a registration procedure 1100 with respect to the network 800 in accordance with some embodiments. The registration procedure 1100 illustrates a scenario in which the UE 104 moves from TA1 to TA3.

At 1104, the UE 104 may be in TA1.

The registration procedure 1100 may include, at 1108, the UE 104 sending a registration request message to the AMF 120. The registration request message may include a requested NSSAI that includes S-NSSAIs a, b, and c.

The registration procedure 1100 may further include, at 1112, the AMF 120 sending a registration accept message to the UE 104. The registration accept message may include an Allowed NSSAI that includes S-NSSAIs a and b and may also include a Rejected NSSAI with S-NSSAI c with a rejection cause that indicates the S-NSSAI is not available in the current TA.

Based on the cause code "S-NSSAI not available in the current TA," the UE 104 may store the rejected S-NSSAI(s) in the Rejected NSSAI for the current tracking area and may not attempt to use the S-NSSAI(s) in the current tracking area until switching off the UE 104, moving out of the current tracking area, the UICC containing the USIM is removed, the entry of the "list of subscriber data" with the SNPN identity of the current SNPN is updated, or the rejected S-NSSAI(s) are removed or deleted.

At 1116, the UE 104 may be in TA3.

The registration procedure 1100 may further include, at 1124, the AMF 120 transmitting a UE configuration update to the UE 104. The UE configuration update may include network slicing subscription change information.

The registration procedure 1100 may further include, at 1128, the UE 104 sending a mobility registration request message with a requested NSSAI having S-NSSAIs a, b, and c.

At 1132, the AMF 120 may transmit a registration accept message that includes an Allowed NSSAI with S-NSSAIs a, b, and c.

In some embodiments, the RAN 108 may provide information to the UE 104 about which tracking area support which slices. For example, the base station 112 may generate a system information block (SIB) message with information to inform the UE 104 about S-NSSAI availability along with TA/frequency support in a current PLMN/RA/TA/cell. This information may be used by the UE 104 in choosing a target PLMN/TA/cell with which it is to attempt registration. The UE 104 may additionally/alternatively use this information to construct a requested NSSAI IE for the registration request message.

As briefly introduced above, some embodiments relate to providing VPLMN network slice information to a roaming UE. In some instances, a roaming UE may activate a service/application requiring a network slice not offered by the serving network but available in the area from other networks. An HPLMN may be able to provide the UE with prioritization information of the VPLMNs with which the UE may register for the network slice.

It may be desirable to determine: how and when the HPLMN provides the UE with information about slice availability per VPLMN and prioritization information of the VPLMNs with which the UE may register for the network slice; what is the content of the information; and how and when to use the information received by the UE from the HPLMN to influence automatic PLMN selection.

Figure 12:
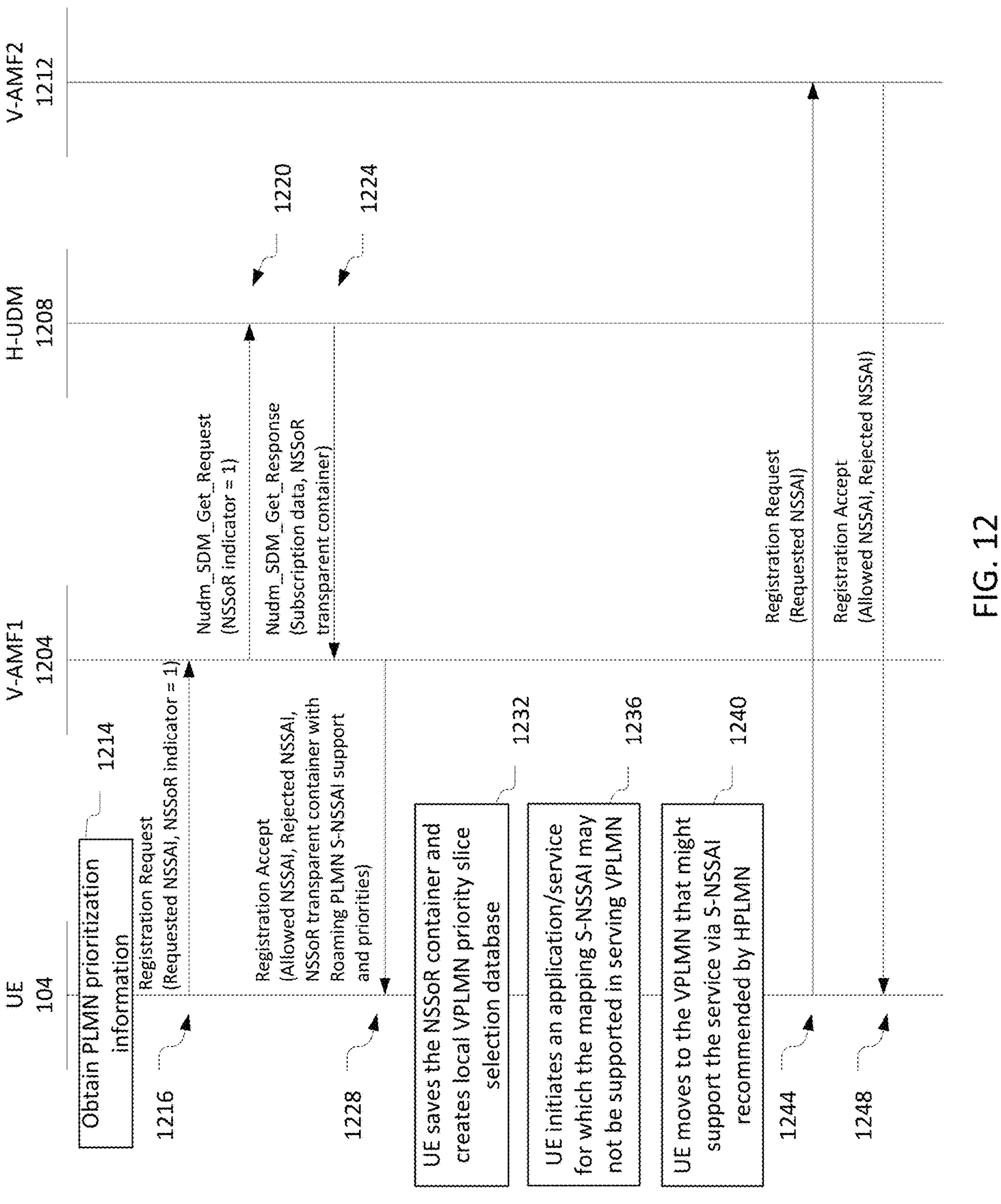
FIG. 12 illustrates another registration procedure in accordance with some embodiments.

FIG. 12 illustrates a registration procedure 1200 with respect to a roaming scenario in accordance with some embodiments. The registration procedure 1200 may include signaling aspects among the UE 104, a first visiting AMF (V-AMF1) 1204, a home UDM (H-UDM) 1208, and a second visiting AMF (V-AMF2) 1212.

At 1214, the UE 104 may obtain steering of roaming (SoR) or other information that prioritizes PLMNs to which the UE 104 is to register while roaming.

When roaming, at 1216, the UE 104 transmit a registration request to V-AMF1 1204 to perform a registration in a first VPLMN. The first VPLMN may be identified based on the SoR information or based on local PLMN selection rules at the UE 104 without an active SoR. The registration request may include a requested NSSAI and a network slice steering of roaming (NSSoR) indicator set to '1.' The NSSoR indicator may indicate that an NSSoR update is requested when set to '1,' and may indicate that an NSSoR update is not requested when set to '0.'

In some embodiments, the NSSoR indicator may be included in a network slicing indication IE that is used to indicate additional information associated with network slicing in a registration procedure. FIG. 13 illustrates a network slicing indication IE 1300 in accordance with some embodiments. The network slicing indication IE 1300 may include one octet in which bits 8-5 may be used for a network slicing indication IEI, bit 4 may be a spare bit that is set to '0,' bit 3 may include the NSSoR indicator, bit 2 may be a default configured NSSAI indication (DCNI), and bit 1 may be a network slicing subscription change indication (NSSCI).

Receipt of the registration request with the NSSoR indication (for example, the NSSoR indicator set to '1') may trigger the V-AMF1 1204 to contact the H-UDM 1208 to retrieve NSSoR information along with subscription information of the UE 104. At 1220, the V-AMF1 1204 may send a subscriber data management (SDM) get-request message (Nudm_SDM_Get_Request) to the H-UDM 1208. The get-request message may include the NSSoR indication (for example, the NSSoR indicator set to '1').

Upon receiving the NSSoR indication in the get-request message, the H-UDM 1208 may retrieve the subscription data along with an NSSoR transparent container that has matching VPLMN(s) priorities and support of slices (for example, S-NSSAIs). The NSSoR transparent container may be an IE that is sent to the UE 104 by the network. The NSSoR transparent container may include information that contains a list of slices, corresponding VPLMN(s) supported and their respective priorities. The NSSoR transparent container may have a type-length-value (TLV) data format and may have a length specified by a length octet in the container. The length may be two or more bits.

At 1224, the H-UDM 1208 may send an SDM get-response message (Nudm_SDM_Get_Response) to the V-AMF1 1204. The get-response message may include the subscription data and the NSSoR transparent container. The NSSoR transparent container may be an integrity-protected container that prevents any modification of the information contained therein by devices (in the VPLMN, for example) that forward the container to the UE 104.

At 1228, the V-AMF1 1204 may send a registration accept message to the UE 104. The registration accept message may include allowed and Rejected NSSAIs, as appropriate, and the NSSoR transparent container with the roaming PLMN S-NSSAI support and priorities. In some embodiments, instead of including the NSSoR transparent container in the registration accept message, the V-AMF1 1204 may include the NSSoR transparent container in a configuration update command transmitted to the UE 104.

The purpose of the NSSoR transparent container IE in the registration accept message may be to provide the list of preferred PLMN/access technology combinations (or HPLMN indication that 'no change of the "operator controlled PLMN selector with access technology" list stored in the UE is needed and thus no list of preferred PLMN/access technology combinations is provided'), or a secured packet with information about the slice supported PLMNs available in roaming and their priority in accordance with the utility requested by the UE 104. It may be noted that the NSSoR container may be a standalone container or may be part of an SoR container.

At 1232, the UE 104 may save the NSSoR container and create a local VPLMN priority slice selection database based on the S-NSSAI support in the NSSoR container.

When the UE 104 invokes an application or service for which mapping S-NSSAI is not supported by a current VPLMN, the UE 104 may perform a VPLMN selection/ based on the VPLMN priority slice selection database. For example, at 1236, the UE 104 may initiate an application or service for which the mapping S-NSSAI may not be supported in the serving VPLMN. The mapping of the application/service to the network slice (e.g., S-NSSAI) may have been provided to the UE 104 by the HPLMN.

The UE 104 may access the local VPLMN priority slice selection database to identify the VPLMNs that supports the network slice required by the application or service. If more than one VPLMN supports the network slice, the UE 104 may use the relative priority information to identify the VPLMN with the highest priority that supports the desired network slice.

At 1240, the UE 104 may move to the target VPLMN that might support the service via the S-NSSAI recommended by the HPLMN.

At 1244, the UE 104 may send a registration request message to the V-AMF2 1212 of the target VPLMN. The registration request message may include a requested NSSAI that includes the recommended S-NSSAI.

At 1248, the V-AMF2 1212 may send a registration accept message to the UE 104 with an Allowed NSSAI or Rejected NSSAI as appropriate.

If the UE 104 terminates the application/service that required the network slice not provided by the previously-serving VPLMN, the UE may register with another VPLMN based on the SoR information originally received at 1214. The other VPLMN may be the previously-serving VPLMN or a different VPLMN.

In some embodiments, a process of a UE configuration update procedure may be used in case of any subscription changes from HPLMN to the UE 104.

The following embodiments provide additional details on how the UE 104 may utilize the VPLMN priority slice selection database.

While camped on a high-priority (HP) PLMN, the UE 104 may retrieve a list of allowed and Rejected NSSAIs. Later, when the UE 104 wants to initiate an application/service for which the mapping HP PLMN S-NSSAI is part of Rejected NSSAI in a current PLMN, the UE 104 may check the VPLMN priority slice selection database to determine whether any VPLMN in a current country supports the S-NSSAI. If so, the UE 104 may be register from a VPLMN that is currently serving the UE 104 and register with the recommended VPLMN. If no VPLMN supports the S-NSSAI, the UE 104 may stay in the current VPLMN and continue the service by utilizing a default slice.

Table 3 illustrates information of a VPLMN priority slice selection database in accordance with some embodiments.

TABLE 3

| HPLMN S-NSSAI | NW provided supporting VPLMN details (MCC-MNC) | UE-derived VPLMN priority list |
|---|---|---|
| S-NSSAI a | 525-01 [Priority 1], 525-05 [Priority 2], 525-02 [Priority 3] | 525-01 [Priority 1] |
| S-NSSAI b | 525-01 [Priority 1], 525-02 [Priority 2] | 525-02 [Priority 2] |
| S-NSSAI c | 525-01 [Priority 1], 525-05 [Priority 2] | 525-05 [Priority 3] |
| S-NSSAI d | 525-05 [Priority 3] | |

For each slice, a number of VPLMNs are provided with corresponding priorities.

Consider, for example, that the UE 104 powers up in a country and camps to an HP PLMN (for example, 525-01). A UE 104 may initiate a first service and determine a preference for S-NSSAI a, thus, the UE 104 may stay in 525-01. The UE 104 may determine the mapping of a service/application to a preferred slice based on a UE route selection policy (URSP) rule.

When the UE 104 initiates a second service, the UE 104 may determine that S-NSSAI d is preferred for the second service (based on a URSP rule). If S-NSSAI d is not supported by current PLMN, the UE 104 may perform an inter-PLMN selection to 525-05 and continue with the second service.

If the UE 104 enters RRC-IDLE or RRC-INACTIVE based on usage statistics, the UE 104 may determine whether to reselect to HP PLMN (525-01). This may be based on preference information from an SoR container.

If, while in 525-05, the UE 104 initiates an augmented reality (AR) or virtual reality (VR) application, which may be associated with a preference for S-NSSAI b, the UE 104 may perform an inter-PLMN selection to 525-01. If 525-01 is not available, the UE 104 may attempt to register with 525-02.

In some embodiments, the UE may derive a VPLMN priority list as shown in Table 3. This may be based on the SoR information, NSSoR information, or UE-preferences.

Figure 14:
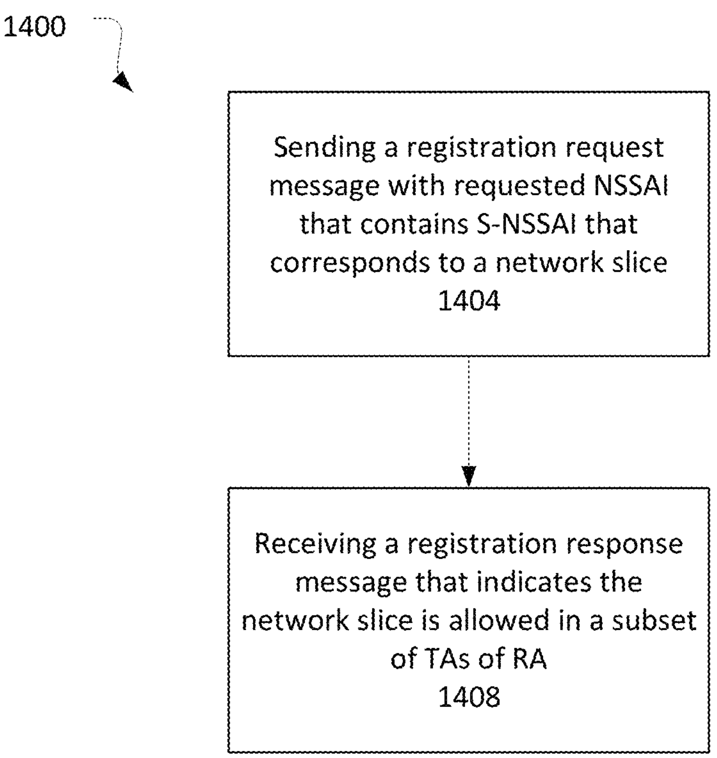
FIG. 14 illustrates an operational flow/algorithmic structure in accordance with some embodiments.

FIG. 14 illustrates an operation flow/algorithmic structure 1400 in accordance with some embodiments. The operation flow/algorithmic structure 1400 may be performed by a UE such as, for example, UE 104 or 1600, or components thereof, for example, processing circuitry 1604.

The operation flow/algorithmic structure 1400 may include, at 1404, sending a registration request message with a requested NSSAI that contains an S-NSSAI that corresponds to a network slice. The network slice is one with which the UE requests registration. The requested NSSAI may include a list of S-NSSAIs that respectively correspond to network slices with which the UE requests registration. The registration request message may be sent for the purposes of an initial registration (after powering up the UE) or a mobility event (after moving to another TA or CAG).

The operation flow/algorithmic structure 1400 may further include, at 1408, receiving a registration response message that indicates the network slice is allowed in a subset of TAs of the RA. The indication may be included in an Allowed NSSAI or in a Rejected NSSAI. If at least one of the requested S-NSSAIs is allowed, the registration response message may be a registration accept message. If none of the requested S-NSSAIs are allowed, the registration response message may be a registration reject message.

Figure 15:
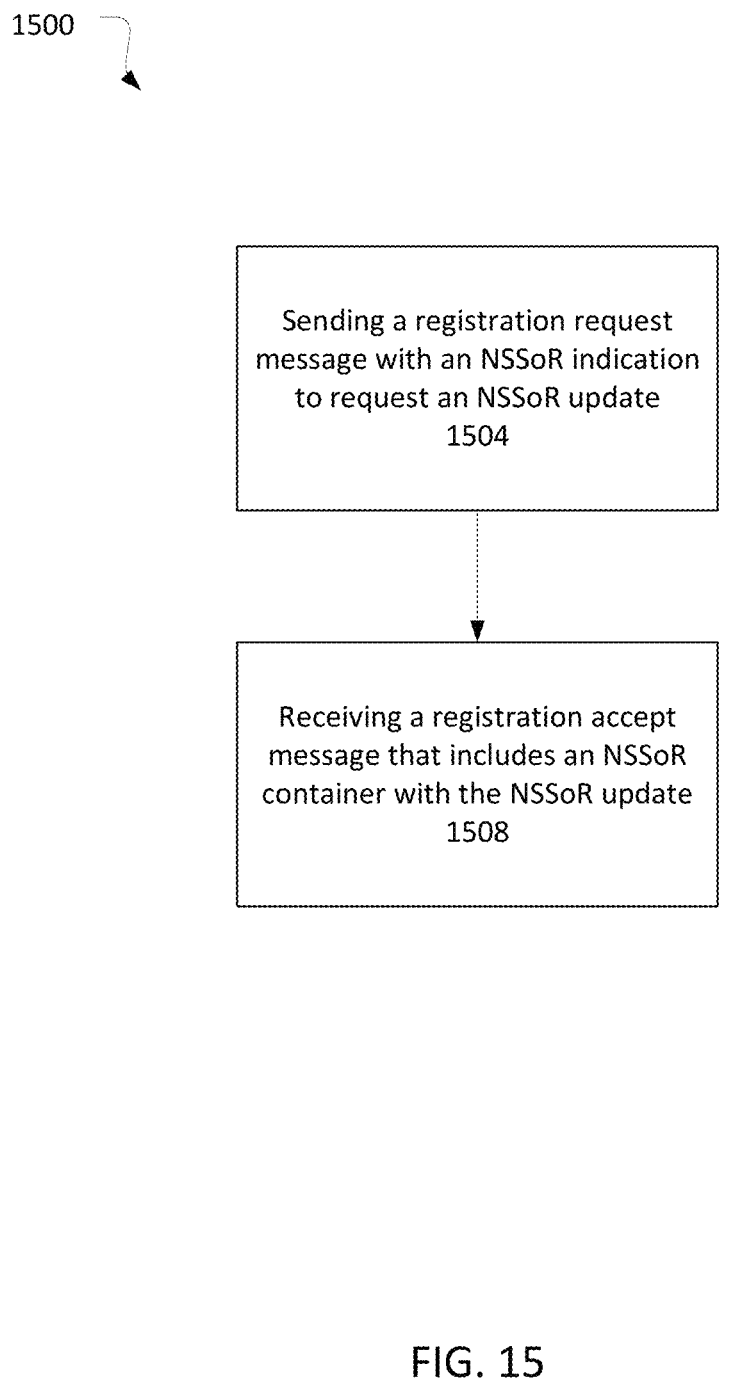

FIG. 15 illustrates an operation flow/algorithmic structure 1500 in accordance with some embodiments. The operation flow/algorithmic structure 1500 may be performed by a UE such as, for example, UE 104 or 1600, or components thereof, for example, processing circuitry 1604.

The operation flow/algorithmic structure 1500 may include, at 1504, sending a registration request message with an NSSoR indication to request an NSSoR update. The registration request message may be sent to an AMF of a VPLMN.

The operation flow/algorithmic structure 1500 may further include, at 1508, receiving a registration accept message that includes an NSSoR transparent container with the NSSoR update. The NSSoR transparent container may include priority and slice-support information for one or more VPLMNs. The UE may store the information from the NSSoR transparent container in a VPLMN priority slice selection database. The UE may later access the VPLMN priority slice selection database in the event an application or service invoked by the UE is mapped to a slice that is not supported by a serving VPLMN.

Figure 16:
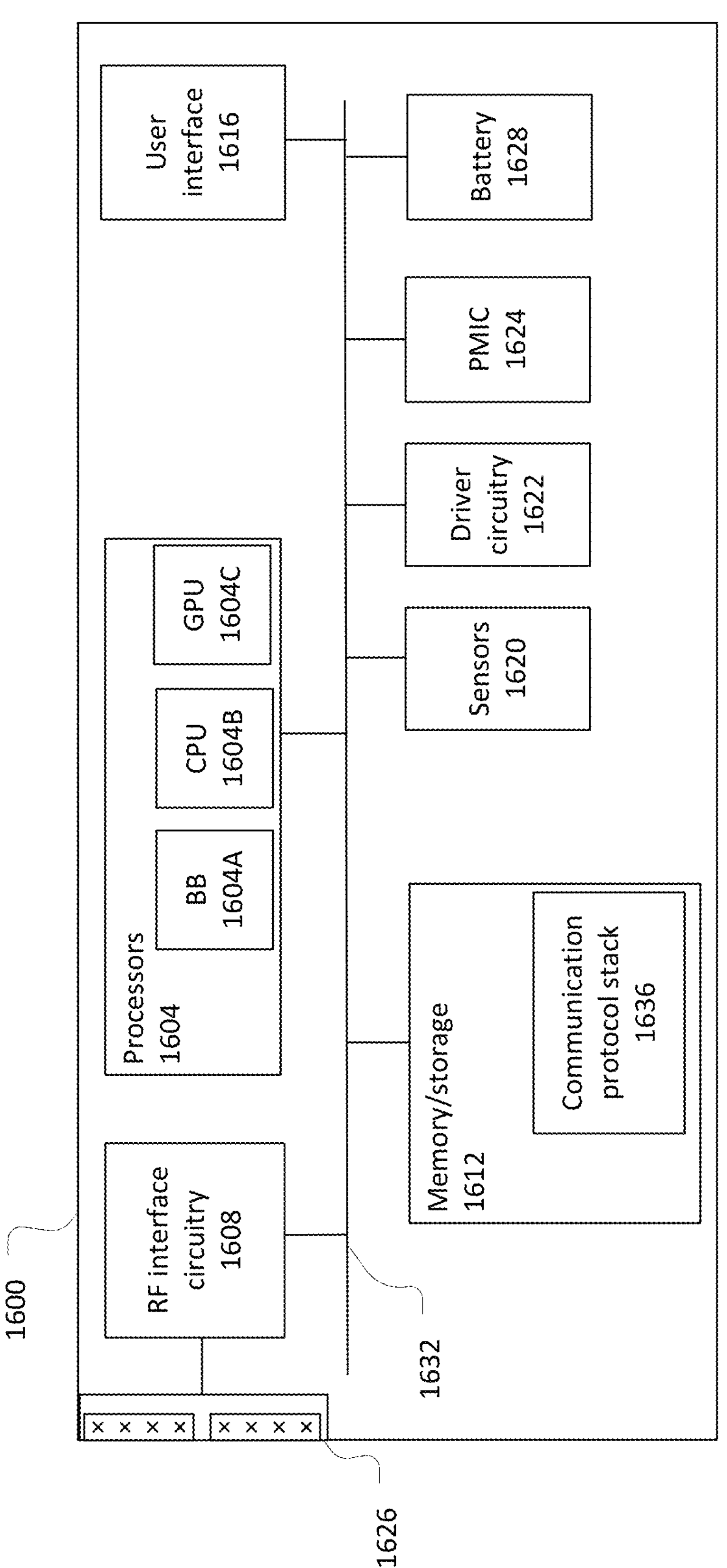
FIG. 16 illustrates a user equipment in accordance with some embodiments.

FIG. 16 illustrates a UE 1600 in accordance with some embodiments. The UE 1600 may be similar to and substantially interchangeable with UE 104 of FIG. 1.

The UE 1600 may be any mobile or non-mobile computing device, such as, for example, mobile phones, computers, tablets, XR devices, glasses, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 1600 may include processors 1604, RF interface circuitry 1608, memory/storage 1612, user interface 1616, sensors 1620, driver circuitry 1622, power management integrated circuit (PMIC) 1624, antenna structure 1626, and battery 1628. The components of the UE 1600 may be implemented as integrated circuits (ICs), portions thereof, discrete electronic devices, or other modules, logic, hardware, software, firmware, or a combination thereof. The block diagram of FIG. 16 is intended to show a high-level view of some of the components of the UE 1600. However, some of the components shown may be omitted, additional components may be present, and different arrangement of the components shown may occur in other implementations.

The components of the UE 1600 may be coupled with various other components over one or more interconnects 1632, which may represent any type of interface, input/output, bus (local, system, or expansion), transmission line, trace, or optical connection that allows various circuit components (on common or different chips or chipsets) to interact with one another.

The processors 1604 may include processor circuitry such as, for example, baseband processor circuitry (BB) 1604A, central processor unit circuitry (CPU) 1604B, and graphics processor unit circuitry (GPU) 1604C. The processors 1604 may include any type of circuitry or processor circuitry that executes or otherwise operates computer-executable instructions, such as program code, software modules, or functional processes from memory/storage 1612 to cause the UE 1600 to perform operations as described herein.

In some embodiments, the baseband processor circuitry 1604A may access a communication protocol stack 1636 in the memory/storage 1612 to communicate over a 3GPP compatible network. In general, the baseband processor circuitry 1604A may access the communication protocol stack 1636 to: perform user plane functions at a PHY layer, MAC layer, RLC sublayer, PDCP sublayer, SDAP sublayer, and upper layer; and perform control plane functions at a PHY layer, MAC layer, RLC sublayer, PDCP sublayer, RRC layer, and a NAS layer. In some embodiments, the PHY layer operations may additionally/alternatively be performed by the components of the RF interface circuitry 1608.

The baseband processor circuitry 1604A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1612 may include one or more non-transitory, computer-readable media that includes instructions (for example, communication protocol stack 1636) that may be executed by one or more of the processors 1604 to cause the UE 1600 to perform various operations described herein. The memory/storage 1612 include any type of volatile or non-volatile memory that may be distributed throughout the UE 1600. In some embodiments, some of the memory/storage 1612 may be located on the processors 1604 themselves (for example, L1 and L2 cache), while other memory/storage 1612 is external to the processors 1604 but accessible thereto via a memory interface. The memory/storage 1612 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1608 may include transceiver circuitry and radio frequency front module (RFEM) that allows the UE 1600 to communicate with other devices over a radio access network. The RF interface circuitry 1608 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1626 and proceed to filter and amplify (with a low-noise amplifier) the signal. The signal may be provided to a receiver of the transceiver that down-converts the RF signal into a baseband signal that is provided to the baseband processor of the processors 1604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1626.

In various embodiments, the RF interface circuitry 1608 may be configured to transmit/receive signals in a manner compatible with NR access technologies.

The antenna 1626 may include antenna elements to convert electrical signals into radio waves to travel through the air and to convert received radio waves into electrical signals. The antenna elements may be arranged into one or more antenna panels. The antenna 1626 may have antenna panels that are omnidirectional, directional, or a combination thereof to enable beamforming and multiple input, multiple output communications. The antenna 1626 may include microstrip antennas, printed antennas fabricated on the surface of one or more printed circuit boards, patch antennas, or phased array antennas. The antenna 1626 may have one or more panels designed for specific frequency bands including bands in FR1 or FR2.

The user interface circuitry 1616 includes various input/output (I/O) devices designed to enable user interaction with the UE 1600. The user interface 1616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1600.

The sensors 1620 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1622 may include software and hardware elements that operate to control particular devices that are embedded in the UE 1600, attached to the UE 1600, or otherwise communicatively coupled with the UE 1600. The driver circuitry 1622 may include individual drivers allowing other components to interact with or control various I/O devices that may be present within, or connected to, the UE 1600. For example, the driver circuitry 1612 may include circuitry to facilitate coupling of a UICC (for example, UICC 148) to the UE 1600. For additional examples, driver circuitry 1622 may include a display driver to control and allow access to a display device, a touchscreen driver to control and allow access to a touchscreen interface, sensor drivers to obtain sensor readings of sensor circuitry 1620 and control and allow access to sensor circuitry 1620, drivers to obtain actuator positions of electro-mechanic components or control and allow access to the electro-mechanic components, a camera driver to control and allow access to an embedded image capture device, audio drivers to control and allow access to one or more audio devices.

The PMIC 1624 may manage power provided to various components of the UE 1600. In particular, with respect to the processors 1604, the PMIC 1624 may control power-source selection, voltage scaling, battery charging, or DC-to-DC conversion.

In some embodiments, the PMIC 1624 may control, or otherwise be part of, various power saving mechanisms of the UE 1600 including DRX as discussed herein.

A battery 1628 may power the UE 1600, although in some examples the UE 1600 may be mounted deployed in a fixed location, and may have a power supply coupled to an electrical grid. The battery 1628 may be a lithium ion battery, a metal-air battery, such as a zinc-air battery, an aluminum-air battery, a lithium-air battery, and the like. In some implementations, such as in vehicle-based applications, the battery 1628 may be a typical lead-acid automotive battery.

Figure 17:
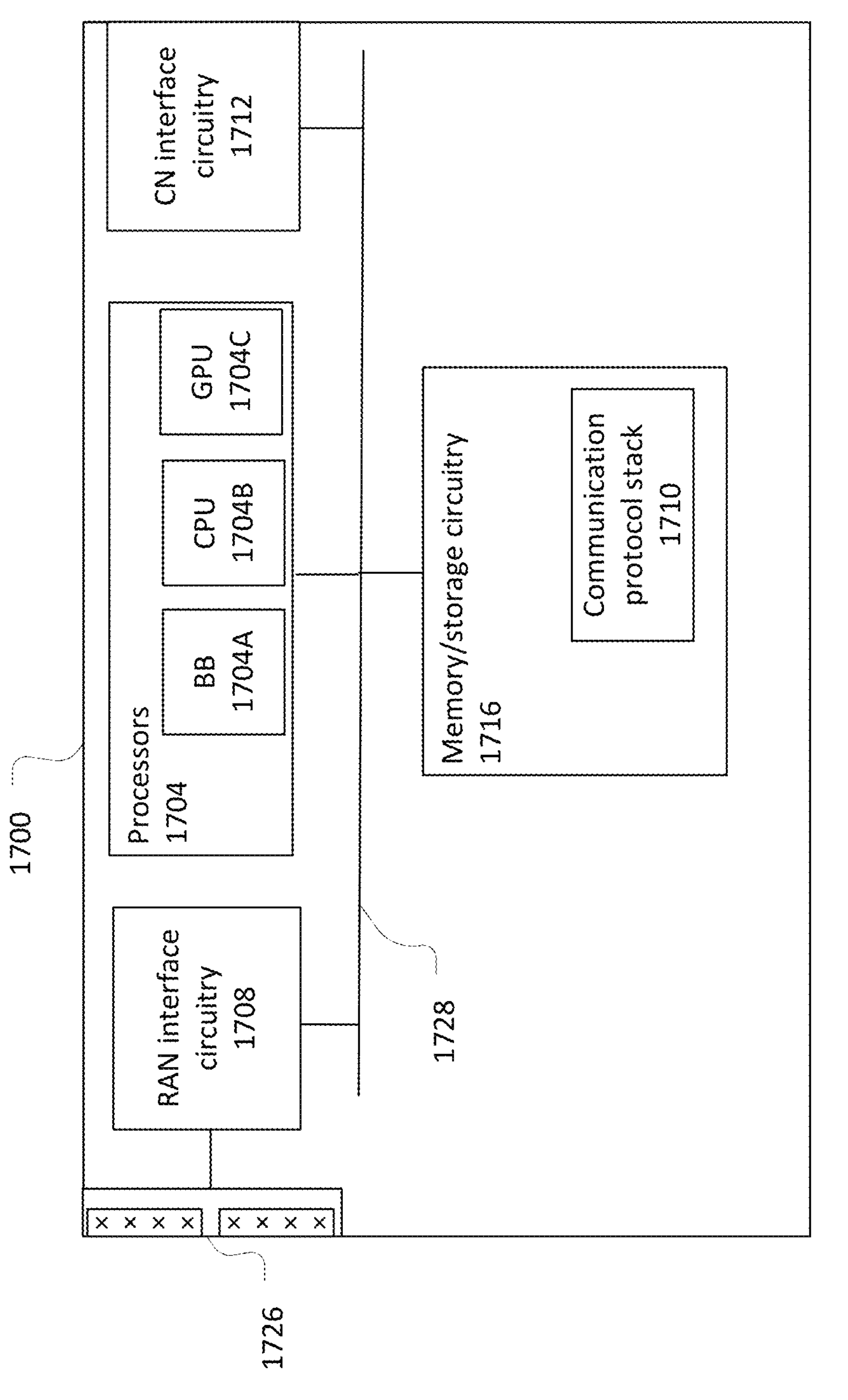
FIG. 17 illustrates a network node in accordance with some embodiments.

FIG. 17 illustrates a network node 1700 in accordance with some embodiments. The network node 1700 may be similar to and substantially interchangeable with a node providing any of the functions of a core network (for example, CN 116 of FIG. 1) or a base station 112.

The network node 1700 may include processors 1704, RF interface circuitry 1708 (if implemented as an access node), core network (CN) interface circuitry 1712, memory/storage circuitry 1716, and antenna structure 1726.

The components of the network node 1700 may be coupled with various other components over one or more interconnects 1728.

The processors 1704, RF interface circuitry 1708, memory/storage circuitry 1716 (including communication protocol stack 1710), antenna structure 1726, and interconnects 1728 may be similar to like-named elements shown and described with respect to FIG. 16.

The CN interface circuitry 1712 may provide connectivity to a core network, for example, a 5th Generation Core network (5GC) using a 5GC-compatible network interface protocol such as carrier Ethernet protocols, or some other suitable protocol. Network connectivity may be provided to/from the network node 1700 via a fiber optic or wireless backhaul. The CN interface circuitry 1712 may include one or more dedicated processors or FPGAs to communicate using one or more of the aforementioned protocols. In some implementations, the CN interface circuitry 1712 may include multiple controllers to provide connectivity to other networks using the same or different protocols.

In some embodiments, the network node 1700 may be coupled with transmit receive points (TRPs) using the antenna structure 1726, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: sending, to an access and mobility management function (AMF), a registration request message with requested network slice selection assistance information (NSSAI) that contains a single-NSSAI (S-NSSAI) that corresponds to a slice with which the UE requests registration; and receiving, in response to the registration request message, a registration accept message that indicates the slice is allowed in a subset of tracking areas (TAs) of a registration area (RA).

Example 2 includes a method of example 1 or some other example herein, wherein the S-NSSAI is a first S-NSSAI, the slice is a first slice, the registration request message further contains a second S-NSSAI that corresponds to a second slice, and the registration accept message indicates the second slice is rejected in at least one TA of the RA.

Example 3 includes the method of example 2 or some other example herein, wherein the registration accept message indicates the second slice is rejected in all TAs of the RA.

Example 4 includes a method of example 2 or some other example herein, wherein the at least one TA is less than all TAs of the RA.

Example 5 includes the method of example 1 or some other example herein, further comprising: storing, in a table, an indication of the slice being allowed in the subset of TAs of the RA.

Example 6 includes a method of example 1 or some other example herein, further comprising: sending the registration request message after powering up in a first TA; or sending the registration request message after moving to a second TA.

Example 7 includes a method of operating an access and mobility management function (AMF), the method comprising: receiving, from a user equipment (UE), a registration request message with requested network slice selection assistance information (NSSAI) that contains a single-NS- SAI (S-NSSAI) that corresponds to a slice with which the UE requests registration; and transmitting, based on the registration request message, a registration accept message that indicates the slice is allowed in a subset of tracking areas (TAs) of a registration area (RA).

Example 8 includes a method of example 7 or some other example herein, wherein the S-NSSAI is a first S-NSSAI, the slice is a first slice, the registration request message further contains a second S-NSSAI that corresponds to a second slice, and the registration accept message indicates the second slice is rejected in at least one TA of the RA.

Example 9 includes the method of example 8 or some other example herein, wherein the registration accept message indicates the second slice is rejected in all TAs of the RA.

Example 10 includes a method of example 8 or some other example herein, wherein the at least one TA is less than all TAs of the RA.

Example 11 includes a method of operating a user equipment (UE), the method comprising: sending, to an access and mobility management function (AMF), a registration request message with requested network slice selection assistance information (NSSAI) that contains a single-NSSAI (S-NSSAI) that corresponds to a slice with which the UE requests registration; and receiving, in response to the registration request message, a registration response message that indicates the S-NSSAI is not available in a tracking area or closed access group (TA/CAG) from which the UE sent the registration request message.

Example 12 includes the method of example 11 or some other example herein, wherein the TA/CAG is a first TA/CAG of a registration area (RA), the requested NSSAI is first requested NSSAI, the registration request message is a first registration request message, and the method further comprises: moving to a second TA/CAG of the RA; and sending, from the second TA/CAG, a second registration request message with second requested NSSAI that contains the S-NSSAI that corresponds to the slice with which the UE request registration.

Example 13 includes the method of example 11 or some other example herein, wherein the requested NSSAI is first requested NSSAI, the registration request message is a first registration request message, and the method further comprises: receiving a UE configuration update; and sending, after receiving the UE configuration update, a second registration request message with second requested NSSAI that contains the S-NSSAI that corresponds to the slice with which the UE request registration.

Example 14 includes method of example 11 or some other example herein, wherein the S-NSSAI is first S-NSSAI, the slice is a first slice, and the requested NSSAI further contains a second S-NSSAI that corresponds to a second slice with which the UE requests registration, and the registration response message is a registration accept message that further indicates the second S-NSSAI is available in the TA/CAG.

Example 15 includes the method of example 11 or some other example herein, wherein requested NSSAI contains a plurality of S-NSSAIs that respectively correspond to a plurality of slices with which the UE requests registration, and the registration response message is a registration reject message that indicates the plurality of S-NSSAIs are not available in the TA/CAG.

Example 16 includes a method of example 11 or some other example herein, wherein the TA/CAG from which the UE sent the registration request message is a first TA/CAG and the registration response message further indicates the S-NSSAI is available in a second TA/CAG.

Example 17 includes a method of operating an access and mobility management function (AMF), the method comprising: receiving, from a user equipment (UE), a registration request message with requested network slice selection assistance information (NSSAI) that contains a single-NSSAI (S-NSSAI) that corresponds to a slice with which the UE requests registration; and transmitting, in response to the registration request message, a registration response message that indicates the S-NSSAI is not available in a tracking area or closed access group (TA/CAG) from which the UE sent the registration request message.

Example 18 includes the method of example 17 or some other example herein, wherein the S-NSSAI is first S-NSSAI, the slice is a first slice, and the requested NSSAI further contains a second S-NSSAI that corresponds to a second slice with which the UE requests registration, and the registration response message is a registration accept message that further indicates the second S-NSSAI is available in the TA/CAG.

Example 19 includes the method of example 17 or some other example herein, wherein requested NSSAI contains a plurality of S-NSSAIs that respectively correspond to a plurality of slices with which the UE requests registration, and the registration response message is a registration reject message that indicates the plurality of S-NSSAIs are not available in the TA/CAG.

Example 20 includes the method of example 17 or some other example herein, wherein the TA/CAG from which the UE sent the registration request message is a first TA/CAG and the registration response message further indicates the S-NSSAI is available in a second TA/CAG.

Example 21 includes a method of operating a base station, the method comprising: generating a system information broadcast (SIB) message to include an indication that a single-network slice selection assistance information (S-NSSAI) that corresponds to a slice is supported in a subset of tracking areas or closed access groups (TAs/CAGs) of a registration area (RA); and transmitting the SIB message.

Example 22 includes a method of example 21 or some other example herein, wherein the S-NSSAI is a first S-NSSAI, the slice is a first slice, the subset is a first subset, and the method further comprises: generating the SIB message to include an indication that a second S-NSSAI that corresponds to a second slice is supported in a second subset of TAs/CAGs of the RA.

Example 23 includes a method of operating a user equipment (UE), the method comprising: sending, to an access and mobility management function (AMF) of a first visited public land mobile network (VPLMN), a registration request message with a network slice steering of roaming (NSSoR) indication; and receiving, in response to the registration request message, a registration accept message that includes an NSSoR container with information that indicates a second VPLMN supports one or more network slices.

Example 24 includes the method of example 23 or some other example herein, wherein the information of the NSSoR container comprises priority and slice-support information for a plurality of VPLMNs.

Example 25 includes the method of example 24 some other example herein, further comprising: storing the priority and slice-support information in a local VPLMN priority slice selection database.

Example 26 includes the method of example 25 or some other example herein, wherein the AMF is a first AMF and the method further comprises: initiating an application or service that is mapped to a first slice; accessing the local VPLMN priority slice selection database to determine the one or more network slices supported by the second VPLMN include the first slice; and sending a registration request message to a second AMF of the second VPLMN based on the one or more network slices including the first slice.

Example 27 includes the method of example 26 or some other example herein, further comprising: accessing the local VPLMN priority slice selection database to determine: a third VPLMN supports the first slice; the second VPLMN is associated with a first priority; and the third VPLMN is associated with a second priority that is less than the first priority; and sending the registration request message to the second AMF of the second VPLMN based on the first priority being greater than the second priority.

Example 28 includes the method of example 26 or some other example herein, further comprising: determining the first VPLMN does not support the first slice; and sending the registration request message to the second AMF of the second VPLMN based on said determining the first VPLMN does not support the first slice.

Example 29 includes the method of example 26 or some other example herein, further comprising: generating the registration request message to include a requested network slice selection assistance information (NSSAI) with a single-NSSAI (S-NSSAI) that corresponds to the first slice.

Example 30 includes the method of example 26 or some other example herein, further comprising: terminating the application or service; and performing a VPLMN reselection based on said terminating the application or service.

Example 31 includes the method of example 30 or some other example herein, further comprising: receiving steering of roaming (SoR) information from a home network; and performing the VPLMN reselection based on the SoR information.

Example 32 includes a method of operating an access and mobility management function (AMF), the method comprising: generating a message to include a network slice steering of roaming (NSSoR) transparent container that indicates a visited public land mobile network that supports a network slice; and transmitting the message to a user equipment (UE).

Example 33 includes the method of example 32 or some other example herein, wherein the message is a registration accept message and the method further comprises: receiving, from the UE, a registration request message with an NSSoR indication to indicate an NSSoR update is requested by the UE.

Example 34 includes the method of example 33 or some other example herein, further comprising: transmitting, to a unified data manager (UDM) of a home network of the UE, a get-request message with the NSSoR indication.

Example 35 includes the method of example 34 some other example herein, further comprising: receiving, from the UDM, a get-response message with the NSSoR transparent container.

Example 36 includes a method of example 32 or some other example herein, wherein the message is a configuration update command.

Example 37 includes a method of operating a unified data manager, the method comprising: receiving, from an access and mobility management function, a get-request message that includes a network slice steering of roaming (NSSoR) indication; and transmitting, to the AMF, a get-response message that includes an NSSoR transparent container with priority and slice-support information for one or more visited public land mobile networks (VPLMNs).

Example 38 includes the method of example 37 or some other example herein, further comprising: transmitting the NSSoR with integrity protection.

Example 39 includes the method of example 37 or some other example herein, further comprising: generating the get-response message to include subscription data for the UE and the NSSoR transparent container.

Example 40 includes a method of operating a user equipment (UE), the method comprising: receiving a message that includes a network slice steering of roaming (NSSoR) container with information that indicates a visited public land mobile network (VPLMN) supports one or more network slices; and storing the information in a local VPLMN priority slice selection database.

Example 41 includes the method of example 40 or some other example herein, further comprising: initiating an application or service that is mapped to a first slice; accessing the local VPLMN priority slice selection database to determine the one or more network slices supported by the VPLMN include the first slice; and sending a registration request message to an access and mobility management function (AMF) of the VPLMN based on the one or more network slices including the first slice.

Example 42 includes the method of example 40 or some other example herein, wherein the message is a registration accept message or a configuration update command message.

Example 43 may include an apparatus comprising means to perform one or more elements of a method described in or related to any of examples 1-28, or any other method or process described herein.

Example 44 may include one or more non-transitory computer-readable media comprising instructions to cause an electronic device, upon execution of the instructions by one or more processors of the electronic device, to perform one or more elements of a method described in or related to any of examples 1-28, or any other method or process described herein.

Example 45 may include an apparatus comprising logic, modules, or circuitry to perform one or more elements of a method described in or related to any of examples 1-42, or any other method or process described herein.

Example 46 may include a method, technique, or process as described in or related to any of examples 1-42, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of examples 1-42, or portions thereof.

Example 48 may include a signal as described in or related to any of examples 1-42, or portions or parts thereof.

Example 49 may include a datagram, information element, packet, frame, segment, PDU, or message as described in or related to any of examples 1-42, or portions or parts thereof, or otherwise described in the present disclosure.

Example 50 may include a signal encoded with data as described in or related to any of examples 1-42, or portions or parts thereof, or otherwise described in the present disclosure.

Example 51 may include a signal encoded with a datagram, IE, packet, frame, segment, PDU, or message as described in or related to any of examples 1-42, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of examples 1-42, or portions thereof.

Example 53 may include a computer program comprising instructions, wherein execution of the program by a processing element is to cause the processing element to carry out the method, techniques, or process as described in or related to any of examples 1-42, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processor circuitry to:

generate, for transmission to a first access and mobility management function (AMF) of a first visited public land mobile network (VPLMN), a first registration request message that includes a requested network slice selection assistance information (NSSAI) and a network slice steering of roaming (NSSoR) indication to request an NSSoR update;

receive, in response to the registration request message, a registration accept message that includes an NSSoR container with information that indicates a second VPLMN supports one or more network slices, wherein the information of the NSSOR container comprises priority and slice-support information for a plurality of VPLMNs;

store the priority and slice-support information in a local VPLMN priority slice selection database;

initiate an application or service that is mapped to a first slice;

access the local VPLMN priority slice selection database to determine the one or more network slices supported by the second VPLMN include the first slice; and generate a second registration request message for transmission to a second AMF of the second VPLMN based on the one or more network slices including the first slice.

2. The one or more non-transitory, computer-readable media of claim 1, wherein the instructions, when executed, further cause the processor circuitry to:

access the local VPLMN priority slice selection database to determine: a third VPLMN supports the first slice; the second VPLMN is associated with a first priority; and the third VPLMN is associated with a second priority that is less than the first priority; and generate the second registration request message for transmission to the second AMF of the second VPLMN based on the first priority being greater than the second priority.

3. The one or more non-transitory, computer-readable media of claim 1, wherein the instructions, when executed, further cause the processor circuitry to:

determine the first VPLMN does not support the first slice.

4. The one or more non-transitory, computer-readable media of claim 3, wherein the instructions, when executed, further cause the processor circuitry to:

generate the second registration request message for transmission to the second AMF of the second VPLMN based on determination that the first VPLMN does not support the first slice.

5. The one or more non-transitory, computer-readable media of claim 1, wherein the requested NSSAI comprises a single-NSSAI (S-NSSAI) that corresponds to the first slice.

6. The one or more non-transitory, computer-readable media of claim 1, wherein the instructions, when executed, further cause the processor circuitry to:

terminate the application or service.

7. The one or more non-transitory, computer-readable media of claim 6, wherein the instructions, when executed, further cause the processor circuitry to:

perform a VPLMN reselection based on termination of the application or service.

8. The one or more non-transitory, computer-readable media of claim 7, wherein the instructions, when executed, further cause the processor circuitry to:

receive steering of roaming (SoR) information from a home network; and perform the VPLMN reselection based on the SoR information.

* * * * *